United States Patent
Kediya et al.

(10) Patent No.: US 12,504,170 B2
(45) Date of Patent: Dec. 23, 2025

(54) DILUTION HORN PAIR FOR A GAS TURBINE ENGINE COMBUSTOR

(71) Applicant: General Electric Company, Schenectady, NY (US)

(72) Inventors: Vishal Sanjay Kediya, Bengaluru (IN); Pradeep Naik, Bengaluru (IN); Ajoy Patra, Bengaluru (IN); Narasimhan S. Sahana, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/494,322

(22) Filed: Oct. 25, 2023

(65) Prior Publication Data

US 2024/0053012 A1    Feb. 15, 2024

Related U.S. Application Data

(62) Division of application No. 17/228,433, filed on Apr. 12, 2021, now abandoned.

(51) Int. Cl.
*F23R 3/00* (2006.01)
*F02C 3/00* (2006.01)
*F23R 3/10* (2006.01)

(52) U.S. Cl.
CPC .................. *F23R 3/10* (2013.01); *F02C 3/00* (2013.01); *F05D 2220/32* (2013.01); *F05D 2240/35* (2013.01)

(58) Field of Classification Search
None
See application file for complete search history.

(56) References Cited

U.S. PATENT DOCUMENTS

| | | | |
|---|---|---|---|
| 4,301,657 A * | 11/1981 | Penny | F23R 3/12 60/750 |
| 9,016,067 B2 | 4/2015 | Gerendas | |
| 9,651,260 B2 | 5/2017 | Sandelis et al. | |
| 10,196,902 B2 | 2/2019 | Moore et al. | |
| 10,634,350 B2 | 4/2020 | Harding et al. | |
| 10,648,666 B2 | 5/2020 | Bouldin et al. | |
| 10,731,562 B2 | 8/2020 | Porter et al. | |
| 2002/0189260 A1 | 12/2002 | David et al. | |
| 2003/0177769 A1* | 9/2003 | Graves | F23R 3/04 60/804 |

(Continued)

FOREIGN PATENT DOCUMENTS

| | | |
|---|---|---|
| CN | 101551119 A | 10/2009 |
| CN | 105258157 A | 1/2016 |
| GB | 2037419 A | 7/1980 |

*Primary Examiner* — Edwin Kang
(74) *Attorney, Agent, or Firm* — Venable LLP; Edward A. Kmett; Michele V. Frank

(57) ABSTRACT

A combustor for a gas turbine engine has an annular inner liner and an annular outer liner forming a combustion chamber therebetween. A dilution horn pair includes dilution horns that provide a flow of an oxidizer gas into the combustion chamber in a dilution zone. At least one of the dilution horns forming the dilution horn pair is arranged so as to provide a lateral flow component of the flow of oxidizer gas therethrough into the combustion chamber, the lateral flow component having a flow direction extending laterally across and non-orthogonal to an axial flow direction of combustion gases within the combustion chamber.

18 Claims, 10 Drawing Sheets

(56) References Cited

U.S. PATENT DOCUMENTS

| | | |
|---|---|---|
| 2007/0125093 A1 | 6/2007 | Burd et al. |
| 2008/0134682 A1* | 6/2008 | Garry ................... F23R 3/06 60/752 |
| 2010/0218503 A1* | 9/2010 | Bronson ................ F23R 3/50 60/754 |
| 2012/0297778 A1* | 11/2012 | Rudrapatna ........... F23R 3/045 60/755 |
| 2013/0327049 A1 | 12/2013 | Cunha et al. |
| 2014/0260298 A1* | 9/2014 | Prociw ................... F23R 3/06 60/737 |
| 2014/0345283 A1 | 11/2014 | Prade et al. |
| 2017/0176005 A1 | 6/2017 | Rimmer et al. |
| 2017/0298817 A1 | 10/2017 | Horiuchi et al. |
| 2019/0085767 A1* | 3/2019 | Vise ....................... F23R 3/002 |
| 2019/0186738 A1 | 6/2019 | Moura et al. |
| 2019/0368736 A1 | 12/2019 | Rudrapatna et al. |
| 2021/0310655 A1 | 10/2021 | Graves et al. |

* cited by examiner

DILUTION HORN PAIR FOR A GAS TURBINE ENGINE COMBUSTOR

CROSS-REFERENCE TO RELATED APPLICATIONS

This application is a divisional of U.S. patent application Ser. No. 17/228,433 filed on Apr. 12, 2021, the contents of which are hereby incorporated by reference in their entirety.

TECHNICAL FIELD

The present disclosure relates to dilution gas flow in a dilution portion of a gas turbine engine. More particularly, the disclosure relates to a dilution horn pair providing dilution air flows in a manner that increases turbulence and mixing with combustion gases so as to reduce NOx (Nitrogen Oxide) emissions.

BACKGROUND

In conventional gas turbine engines, it has been known to provide a flow of dilution air into a combustion chamber downstream of a primary combustion zone. Conventionally, an annular combustor may include both inner and outer liners forming a combustion chamber between them. The inner and outer combustion liners may include dilution holes through the liners that provide a flow of air from a passage surrounding the annular combustor into the combustion chamber. Some applications have been known to use circular holes, while other applications have been known to use different shapes of dilution holes for providing dilution air flow to the combustion chamber. Other applications have been known to use axially-aligned angled dilution holes through the liner. The angled dilution holes are generally aligned in a flow direction from upstream to downstream so as to provide a flow of dilution air to the combustion chamber. Some other applications may include a flared outlet on the inner portion of the hole to provide a larger spread of the dilution air near the hole outlet. Still other applications may use a raised inlet or standoff around the dilution hole. The standoff is generally aligned normal to the surface of the liner so as to provide a flow of dilution air straight-in to the combustion chamber. The flow of air through the dilution holes in the conventional combustor is generally normal to the surface of the liner, and generally stays close to the surface of the liner. The conventional dilution air flow close to the surface of the liner helps to cool the liner.

BRIEF SUMMARY

To address the foregoing problems in the conventional art, the present inventors have devised techniques for increasing the penetration of the dilution air flow jets deeper within the combustor, and to also provide better mixing of the dilution air laterally within the combustor. According to one aspect, the present disclosure relates to a combustor for a gas turbine engine, where the combustor has an annular inner liner having a cold surface side and a hot surface side, an annular outer liner having a cold surface side and a hot surface side, and a combustion chamber formed between the hot surface side of the annular inner liner and the hot surface side of the annular outer liner. The combustion chamber provides for a flow of combustion gases in an axial flow direction from an upstream end of the combustion chamber to a downstream end of the combustion chamber. The combustor further has a first oxidizer inlet horn that provides a flow of an oxidizer gas therethrough from a cold side oxidizer flow passage of the combustor into the combustion chamber and a second oxidizer inlet horn that provides a flow of the oxidizer gas therethrough from the cold side oxidizer flow passage of the combustor into the combustion chamber. Further, according to the present aspect of the disclosure, the first oxidizer inlet horn and the second oxidizer inlet horn are arranged as a horn pair, where the horn pair is arranged on at least one of the annular inner liner and the annular outer liner, and at least one of the first oxidizer inlet horn and the second oxidizer inlet horn of the horn pair is arranged to provide a lateral flow component of their respective flow of oxidizer gas therethrough into the combustion chamber, the lateral flow component comprising a flow direction extending laterally across and non-orthogonal to the axial flow direction of the combustion chamber.

In another aspect, the present disclosure relates to a dilution horn pair component for a combustor of a gas turbine engine. According to this aspect, the dilution horn component may be formed as an insert for the combustor liner, for example. The horn component has a base having a cold side surface and a hot side surface, A first oxidizer inlet horn is connected to the base, the first oxidizer inlet horn having an axial passage therethrough from a distal end of the first oxidizer inlet horn to a proximal end of the first oxidizer inlet horn extending through the hot side surface of the base. A second oxidizer inlet horn is connected to the base, the second oxidizer inlet horn having an axial passage therethrough extending from a distal end of the second oxidizer inlet horn to a proximal end of the second oxidizer inlet horn extending through the hot side surface of the base. The first oxidizer inlet horn and the second oxidizer inlet horn are arranged on the base such that an axis of the axial flow passage of the first oxidizer inlet horn and an axis of the axial flow passage of the second oxidizer inlet horn converge at a given distance from the hot side surface of the base.

Additional features, advantages, and embodiments of the present disclosure are set forth or apparent from consideration of the following detailed description, drawings, and claims. Moreover, it is to be understood that both the foregoing summary and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
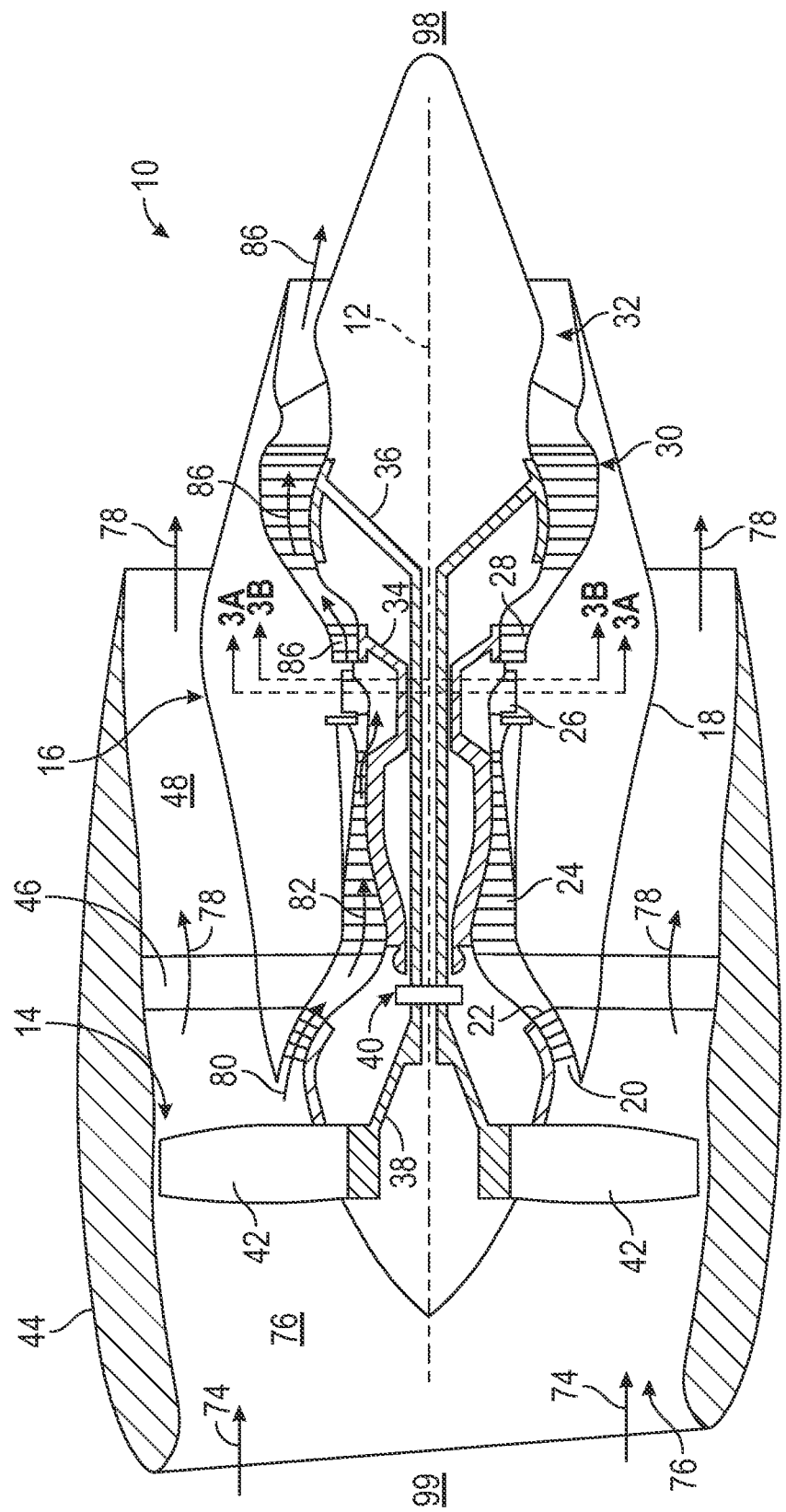
FIG. 1 is a schematic partially cross-sectioned side view of an exemplary high by-pass turbofan jet engine, according to an embodiment of the present disclosure.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

In addition, the term "dilution horn" may be used herein interchangeably with "oxidizer inlet horn" and "dilution horn pair" may be used interchangeably with the term "horn pair".

Airflow through dilution holes in a conventional combustor is generally normal to the surface of the liner, and generally stays close to the surface of the liner. The radial distance between the outer liner dilution holes and the inner liner dilution holes is higher than the penetration of dilution flow jets from the dilution holes, thereby resulting in almost no interaction between the outer liner dilution flow jet and the inner liner dilution flow jet. Since the dilution air flow provided by the outer liner in the conventional combustor does not interact with the dilution air provided by inner liner, a lower turbulence level is created in the core of the combustor that results in poor mixing of the dilution air with products of combustion from the primary zone of the combustor. Additionally, there is almost no interaction between adjacent dilution jets in the lateral direction. As a result, less mixing of the dilution air with the combustion gases occurs laterally, thereby resulting in higher NOx emissions. Further, the lower dilution mixing of the conventional combustor results in higher temperature combustion gases entering the turbine section, thus reducing the life of the turbine.

The present disclosure generally relates to providing dilution air flow into a dilution zone of a combustor. According to one aspect of the present disclosure, an annular combustor of a gas turbine engine has an annular inner liner and an annular outer liner forming a combustion chamber between them. An outer air flow passage surrounds the outer and inner liners and includes a flow of air therein to be used for various purposes, including cooling of the outer and inner liners and dilution of combustion gases generated within the combustion chamber. Formed on the outer liner and/or the inner liner, extending within the outer flow passage, are pairs of dilution horns. Each dilution horn includes a flow passage therethrough so as to provide a flow of the air from the outer air flow passage into the combustion chamber within the dilution zone of the combustion chamber. The dilution zone of the combustion chamber is generally downstream of a primary combustion zone where a fuel-air mixture is ignited to generate combustion gases. The combustion gases flow downstream through the combustion chamber from the primary zone to the dilution zone. In the dilution zone, air flowing though the flow passage of each dilution horn is mixed with the combustion gases.

According to aspects of the present disclosure, the dilution horns forming a dilution horn pair are arranged so as to provide a lateral flow component of the air within the combustion chamber. That is, the flow of the air through the dilution horns is directed at least partially laterally (i.e., across the flow direction of the combustion gases and non-orthogonal to the flow direction of the combustion gases). In some aspects, the dilution horn pair may include two dilution horns that are arranged at an angle such that their respective air flows converge on one another within the combustion chamber, providing better turbulence in the region where two jets interact, resulting in better mixing of dilution air with products of combustion from the primary zone of the combustor. In other aspects, the dilution horn pair may include two dilution horns that are arranged at an angle such that their respective air flows diverge from one another within the combustion chamber, but do interact with the dilution jets of an adjacent dilution horn pair. In yet other aspects, the dilution horn pair may include two dilution horns functioning in cooperation with a main jet dilution hole between them. With each of these aspects, however, the dilution horns project their respective flow of air deeper into the combustion chamber away from the surface of the liner, so that dilution air jets from the outer liner and from the inner liner interact in the core of the combustor, resulting in higher turbulence and better mixing of the dilution air with the combustion gases.

In other aspects, the dilution horn pairs of the outer liner may be provided in a particular alignment with the dilution horn pairs of the inner liner. Due to the deeper penetration of the air flow from the dilution horns, the air flow from the outer liner dilution horns and the air flow from the inner liner dilution horns can be mixed with each other within the combustion chamber. This aspect provides even further mixing of the combustion gases prior to entering the turbine section.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, engine 10 has a longitudinal or axial centerline axis 12 that extends therethrough from an upstream end 99 to a downstream end 98 for reference purposes. In general, engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, although not illustrated, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
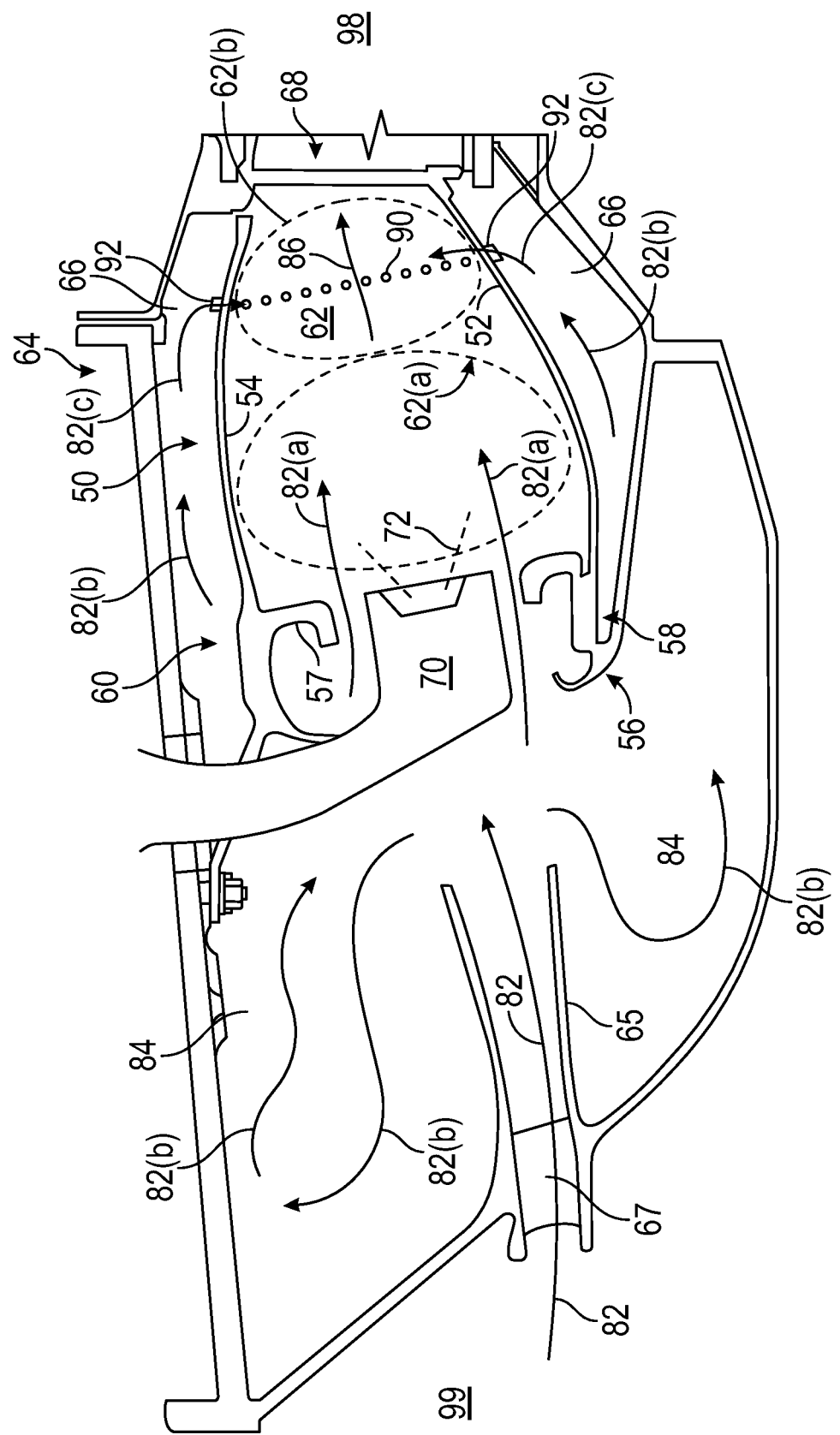
FIG. 2 is a cross-sectional side view of an exemplary combustion section, according to an embodiment of the present disclosure.

FIG. 2 is a cross-sectional side view of an exemplary combustion section 26 of the core engine 16 as shown in FIG. 1. As shown in FIG. 2, the combustion section 26 may generally include an annular type combustor assembly 50 having an annular inner liner 52, an annular outer liner 54, and a bulkhead wall 56, together defining a combustion chamber 62. The combustion chamber 62 may more specifically define a region defining a primary combustion zone 62(*a*) at which initial chemical reaction of the fuel-oxidizer mixture and/or recirculation of the combustion products may occur before flowing further downstream to dilution zone 62(*b*), where mixture and/or recirculation of combustion products and air may occur before flowing to the HP and LP turbines 28, 30. The bulkhead wall 56 and dome assembly 57 each extend radially between upstream ends 58, 60 of the radially spaced inner liner 52 and the outer liner 54, respectively. The dome assembly 57 is disposed downstream of the bulkhead wall 56, adjacent to the generally annular combustion chamber 62 defined between the dome assembly 57, the inner liner 52, and the outer liner 54. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within a diffuser or outer casing 64. An outer flow passage 66 may be defined around the inner liner 52 and/or the outer liner 54. The inner liner 52 and the outer liner 54 may extend from the bulkhead wall 56 towards a turbine nozzle or inlet 68 to the HP turbine 28 (FIG. 1), thus, at least partially defining a hot gas path between the combustor assembly 50 and the HP turbine 28.

As further seen in FIG. 2, each of inner liner 52 and outer liner 54 of the combustor 50 may include main jet diffusion holes 90 and dilution horns 92. In the present disclosure, it is noted that a dilution horn refers to an oxidizer inlet horn that provides a flow of oxidizer therethrough. As will be described in more detail below, main jet dilution holes 90 and dilution horns 92 operate in conjunction with one another to provide a flow of air 82(*c*) therethrough and into the combustion chamber 62. The flow of air 82(*c*) can thus be utilized to both cool a portion of the inner and outer lines 52, 54, and also to provide cooling to the combustion gases 86 downstream of the primary combustion zone 62(*a*) so as to cool the flow of combustion gases 86 entering the turbine section.

During operation of the engine 10, as shown in FIGS. 1 and 2 collectively, a volume of air as indicated schematically by arrows 74 enters the engine 10 from upstream end 99 through an associated inlet 76 of the nacelle 44 and/or fan assembly 14. As the air 74 passes across the fan blades 42, a portion of the air as indicated schematically by arrows 78 is directed or routed into the bypass airflow passage 48, while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows across a compressor exit guide vane (CEGV) 67 and through a pre-diffuser 65 into a diffuser cavity or head end portion 84 of the combustion section 26.

The compressed air 82 pressurizes the diffuser cavity 84. A first portion of the compressed air 82, as indicated schematically by arrows 82(*a*), flows from the diffuser cavity 84 into the combustion chamber 62 where it is mixed with the fuel 72 ejected from fuel-nozzle 70 and burned, thus generating combustion gases, as indicated schematically by arrows 86, within a primary combustion zone 62(*a*) of the combustor assembly 50. Typically, the LP and HP compressors 22, 24 provide more compressed air to the diffuser cavity 84 than is needed for combustion. Therefore, a second portion of the compressed air 82 as indicated schematically by arrows 82(*b*) may be used for various purposes other than combustion. For example, as shown in FIG. 2, compressed air 82(*b*) may be routed into the outer flow passage 66 to provide cooling to the inner and outer liners 52, 54. A portion of the air 82(*b*) may be routed through main jet dilution holes 90 and through dilution horns 92 (schematically shown as air 82(*c*)) and into the dilution zone 62(*b*) of combustion chamber 62 to provide cooling to the internal liner 52 and outer liner 54. Air 82(*c*) may also provide cooling of the combustion gases 86 in dilution zone 62(*b*), and may also provide turbulence to the flow of combustion gases 86 so as to provide better mixing of the dilution oxidizer gas (air flow 82(*c*)) with the combustion gases 86. In addition, or in the alternative, at least a portion of compressed air 82(*b*) may be routed out of the diffuser cavity 84. For example, a portion of compressed air 82(*b*) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsion at downstream end 98.

Figure 3A:
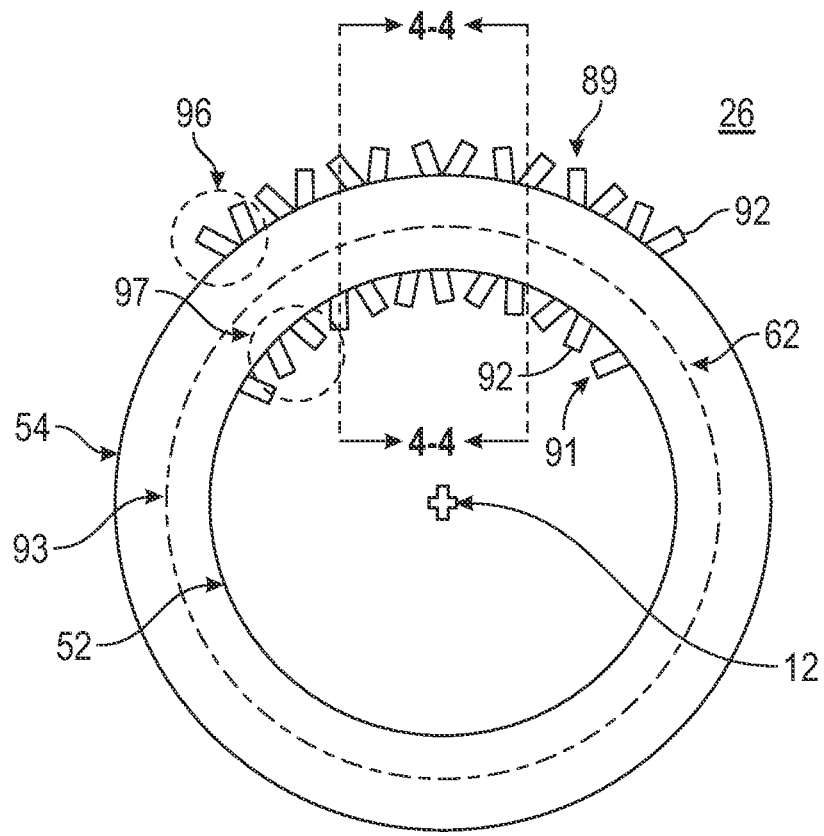
FIG. 3A is a cross-sectional view through an annular combustor, taken at plane 3A-3A of FIG. 1.

FIG. 3A is a cross-sectional view of an annular combustor taken along plane 3A-3A seen in FIG. 1. In FIG. 3A, cross sections of HP turbine shaft 34 and LP turbine shaft 36 have been omitted. As seen in FIG. 3A, combustor 26 is a generally annular combustor that includes the outer liner 54 and inner liner 52. The outer liner 54 and inner liner 52 are generally formed concentric about engine centerline 12 and form combustion chamber 62 therebetween. According to aspects of the present disclosure, dilution horns 92 are provided along an outer circumference of outer liner 54, and, as will be described below, the dilution horns 92 are formed in dilution horn pairs 96. Similarly, provided along an inner circumference of inner liner 52 are dilution horns 92 formed as dilution horn pairs 97. Horn pairs 96, 97 provide a flow of oxidizer gas (e.g., air 82*c*) from the outer passage 66 to the combustion chamber 62 for dilution mixing with combustion gases 86 in dilution zone 62(*b*) of the combustor 62. For convenience, FIG. 3A merely depicts a few dilution horns 92 about the annular combustor, but it can be appreciated that the dilution horns 92 are provided around the entire outer circumference of outer liner 54 and/or about the entire inner circumference of inner liner 52.

Combustion chamber 62 is seen formed between outer liner 54 and inner liner 52. A median portion between the inner liner 52 and the outer liner 54 is generally represented by concentric centerline 93. Concentric centerline 93 depicted in FIG. 3A is generally a middle area or core of the combustion chamber between the inner and outer liners 52, 54 where combustion gases 86 mix with the flow of air 82(*c*) that is projected by the horn pairs 96, 97 toward the median portion 93. As one example, the median portion may be an area surrounding the centerline 93, such as an area on either side of the centerline 93 encompassing about +/−15% of the total width between the liner.

As can be appreciated, a circumferential size of the annular combustor varies along the axial flow direction from the upstream end of the combustor to the downstream end of the combustor, such that the inner and outer liners 52, 54 converge from a large circumference at the upstream end to a smaller circumference at the downstream end at outlet 68 of the combustor. Therefore, the cross-section depicted in FIG. 3A is merely an example of one axial location along the combustor in the flow direction at which the dilution horns 92 are located. That is, dilution horns 92 may generally be located about the outer liner, the inner liner or both the outer and inner liner along the circumference of the outer/inner liners 54, 52 at the same axial location along the length of the combustor. Alternatively, as described below, the dilution horns 92 may include multiple rings of dilution horns around the circumference of the outer liner and the inner liner, where each ring is spaced at a different axial length along the circumference of the respective liner.

Various arrangements of oxidizer inlet (dilution) horns 92 forming horn pairs 96, 97 will be described in more detail below. One object of the dilution horns of the dilution horn pairs is to provide a flow of oxidizer into the combustion chamber with a lateral flow component. According to the present disclosure, the lateral flow component is laterally across the combustion chamber and non-orthogonal to the axial direction of the flow of the combustion gases within the combustion chamber (i.e., does not extend orthogonal radially with the axial direction of the flow of the combustion gases). That is, the lateral flow is directed at an acute (non-orthogonal) angle with respect to the combustor liner surface across the combustion chamber and is not directed radially toward the axial direction. The lateral flow component creates adjacent jets to interact with each other, resulting in greater turbulence and hence, mixing with the combustion gases from the primary combustion zone so as to reduce NOx emissions. Another object of the oxidizer flow provided by the horn pairs is to provide better quenching of the combustion gases deeper within the combustion chamber (i.e., further away from the inside surface of the respective liners). Of course, the present disclosure is not limited to the dilution horns providing only a lateral flow component, but they may also provide an axial flow component in conjunction with the lateral flow component. The dilution horns may further provide a perpendicular flow component that is perpendicular to the inner surface of the liner directed toward the engine centerline 12.

Figure 4:
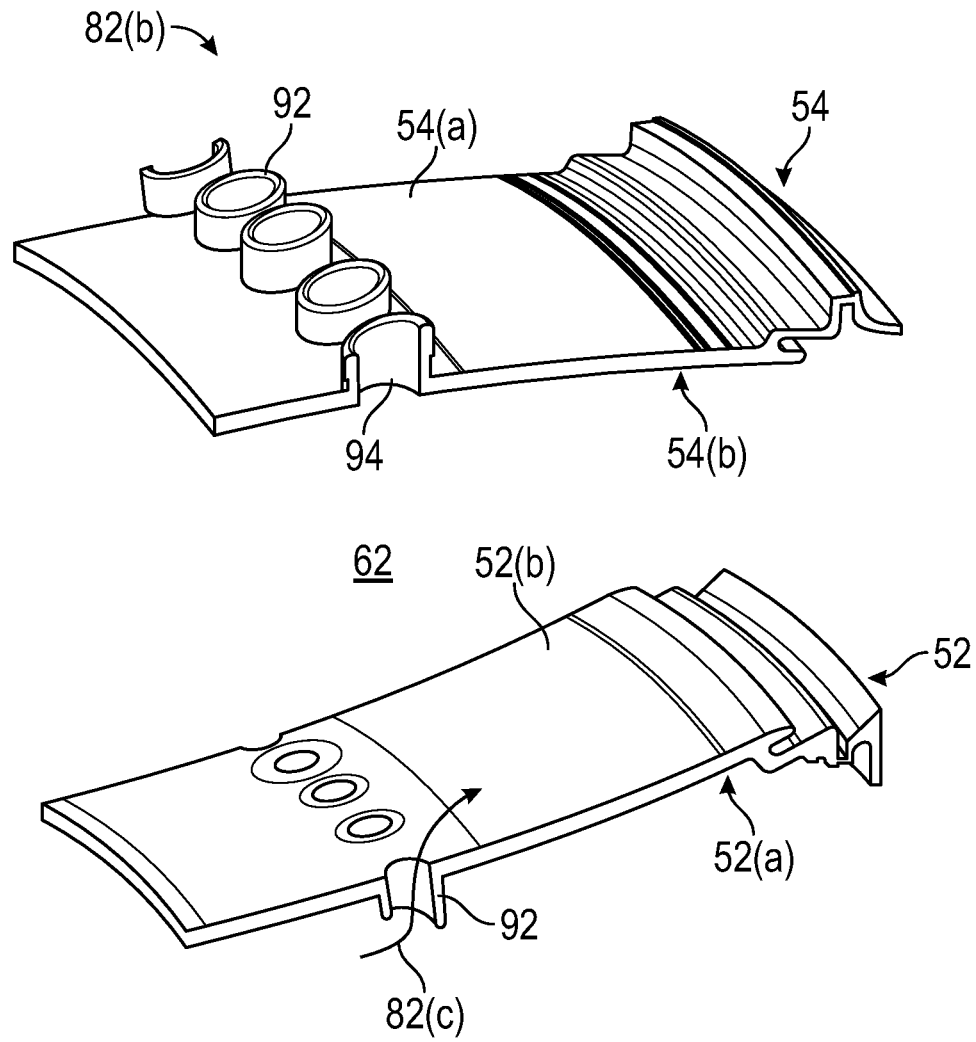
FIG. 4 is a perspective view of a section of combustor liners, according to an embodiment of the present disclosure.

FIG. 4 is a perspective view of a portion of the annular combustor liner depicting a portion of inner liner 52 and outer liner 54 between planes 4-4 shown in FIG. 3A. Both inner liner 52 and outer liner 54 are seen to include dilution horns 92 along circumferences of their respective cold side surfaces 52(*a*), 54(*a*). Dilution horns 92 can be seen to include a flow passage 94 therethrough that provides a flow of oxidizer 82(*c*) into the combustion chamber 62. As was previously discussed, the dilution horns 92 are generally located downstream of the primary combustion zone 62(*a*) in dilution zone 62(*b*). Air 82(*b*) flows within outer flow passage 66 (FIG. 2) along the cold side surface 52(*a*) of inner liner 52 and along cold side surface 54(*a*) of outer liner 54. A portion of the air 82(*b*) is directed through the flow passage 94 of dilution horns 92 into the dilution zone 62(*b*) of combustion chamber 62. According to the present disclosure, various arrangements of dilution horns 92 are provided so as to help reduce NOx emissions.

Figure 5:
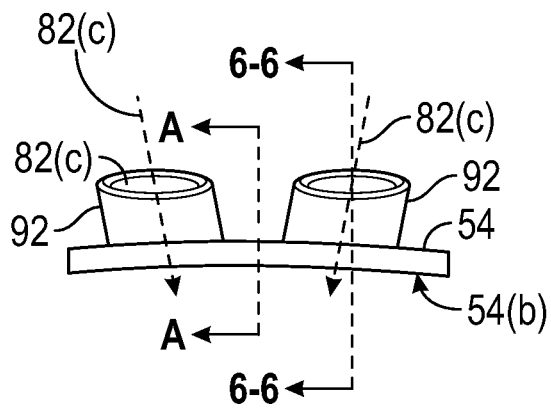
FIG. 5 is an aft looking view of a portion of a combustor liner, according to an embodiment of the present disclosure.

FIG. 5 is an aft-looking view of a portion of outer liner 54 depicted in FIG. 4. As seen in FIG. 5, successive dilution horns 92 (i.e., horns arranged next to one another in a circumferential direction about the liner) may be arranged at an angle so as to direct their respective flows of air 82(*c*) toward one another (converging) within the combustion chamber. As also can be seen in FIG. 5, each of the flows 82(*c*) from the dilution horns 92 converge a given distance away from the hot side surface 54(*b*) of the outer liner 54. In some aspects of the present disclosure, the given distance may be a median location of the distance between the hot side surface 54(*b*) of the outer liner 54 and the hot side surface 52(*b*) of the inner liner, such as median centerline 93

(FIG. 3A). A similar arrangement of the dilution horns 92 may be included on inner liner 52, with a similar convergence of the flows 82(c). Of course, and as will be explained in detail below, in other aspects of the present disclosure, the dilution horns 92 are not limited to directing flow toward one another (converging) and various additional arrangements can be implemented instead, such as diverging flows or converging flows offset to provide a shear component of the converging flows.

Figure 6:
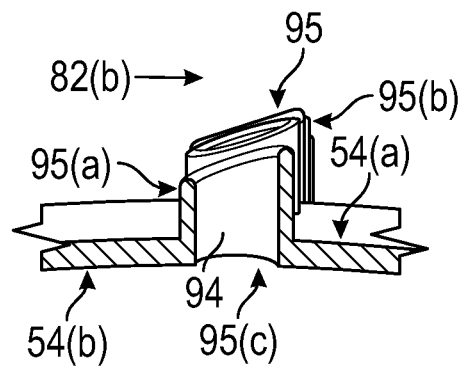
FIG. 6 is a cross-sectional view of a dilution horn, according to an embodiment of the present disclosure.

FIG. 6 is a cross-sectional view across plane 6-6 seen in FIG. 5. As seen in FIG. 6, the dilution horn flow passage 94 of dilution horn 92 extends through the dilution horn 92. According to the present disclosure, the dilution horn 92 may extend from the cold side surface 54(a) of the liner 54 into the flow passage 66 such that a distal end 95 forms an inlet of the dilution horn. According to the present disclosure, the distal end 95 of the dilution horn 92 may be angled such that a downstream portion 95(b) of the distal end 95 is longer than an upstream portion 95(a). That is, the downstream portion 95(b) extends further from the cold side surface 54(a) into the flow passage 66 than the upstream portion 95(a). Thus, with the flow of air 82(b) in FIG. 6 being from left (upstream) to right (downstream), the angled distal end may provide for capturing additional air from the air flow 82(b). Of course, the distal end 95 is not limited to being angled as shown in FIG. 6, and other arrangements may be implemented instead. Moreover, the angle selected for the distal end may be varied according to a desired amount and pressure of the air flow 82(c) to be provided to the combustion chamber 62.

In FIG. 6, it can be seen that, according to the present disclosure, a proximal end 95(c) of the dilution horn 92 is congruent with the hot side surface 54(b) of the inner liner 54. However, in other aspects of the disclosure, the proximal end 95(c) may extend beyond the hot side surface 54(a) and into the combustion chamber 62 a given distance from the hot side surface 54(b). Such an extension of the proximal end into the combustion chamber 62 may provide for additional penetration of the dilution jet and hence higher turbulence and mixing of the flow 82(c) with the combustion gases 86 deeper into the combustion chamber 62 away from the hot side surface 54(b).

Figure 8:
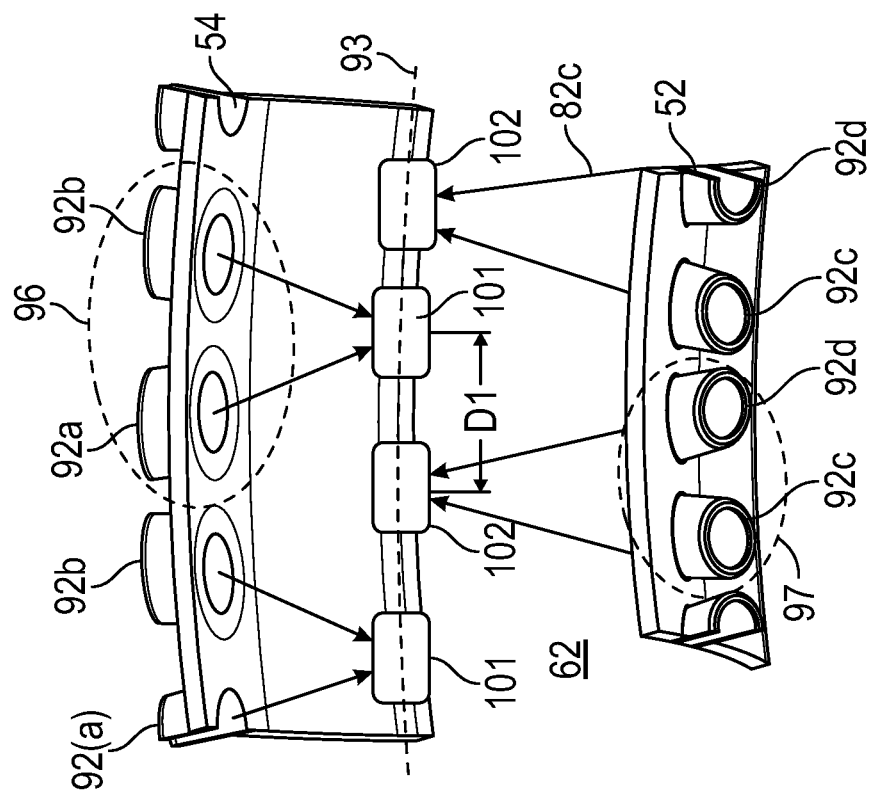
FIG. 8 is a cross-sectional view of an arrangement of dilution horns on inner and outer combustion liners, according to an embodiment of the present disclosure.
Figure 7:
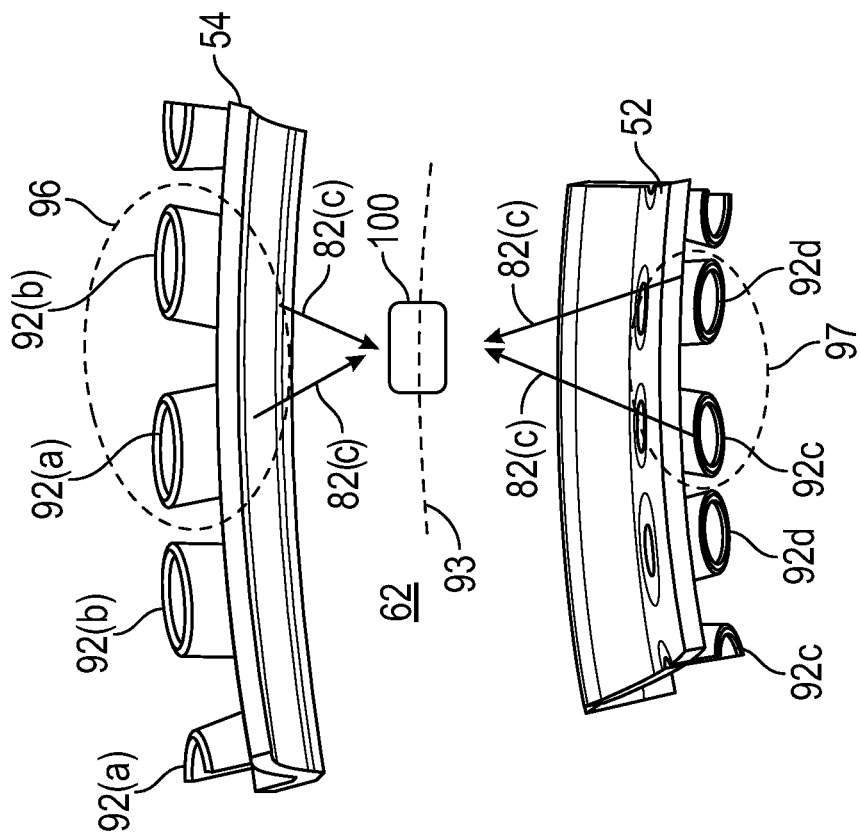
FIG. 7 is a cross-sectional view of an arrangement of dilution horns on inner and outer combustion liners, according to an embodiment of the present disclosure.

FIGS. 7 and 8 depict various alignments of dilution horn pairs arranged on the inner liner 52 with respect to dilution horn pairs arranged on the outer liner 54 so as to provide a desired mixing of the respective flows within the combustion chamber 62. In both FIGS. 7 and 8, two successive dilution horns 92(a) and 92(b) on outer liner 54 form an outer liner horn pair 96 (FIG. 3A), and, likewise, two successive dilution horns 92(c) and 92(d) on inner linter 52 form an inner liner horn pair 97 (FIG. 3A). As shown in FIGS. 7 and 8, multiple horn pairs 96 may be arranged about the circumference of the hot side surface 54(a) of outer liner 54, and multiple horn pairs 97 may be arranged about the circumference of cold side surface 52(a) of inner liner 52.

In FIGS. 7 and 8, the dilution horns 92 of the dilution horn pairs 96, 97 of the inner/outer liners 52, 54 are arranged in the manner depicted in FIG. 5 such that the air flow 82(c) through each dilution horn flow passage converges on one another within the combustion chamber 62. In FIG. 7, one aspect according to the present disclosure is depicted in which an angular and radial arrangement of the dilution horns are set so that the air flow 82(c) from the dilution horns 92(a), 92(b) of the dilution horn pair 96, and the air flow 82(c) from dilution horns 92(c), 92(d) of dilution horn pair 97 converge at a common mixing area 100 within the combustion chamber 62. That is, each dilution horn pair 96 and 97, which include converging flow dilution horns 92 and 97, are arranged circumferentially spaced about the surface of their respective liners 52, 54 with respect to the engine centerline 12, so as to provide their respective air flow 82(c) at the common mixing location 100 as shown in FIG. 7. In one embodiment according to the present disclosure, the common mixing location 100 may be located along the circumferential combustor centerline 93. This arrangement of the disclosure can provide greater turbulence and mixing at the common mixing location.

FIG. 8 shows an embodiment according to the present disclosure in which an angular and radial arrangement of the dilution horn pairs 96, 97 are set so that the air flow 82(c) from the dilution horn pairs 96 and 97 converge offset from one another, as compared with the common mixing location of FIG. 7. More specifically, the dilution horn pair 96 of the outer liner 54 may converge at a first mixing location 101 within the combustion chamber 62, while the air flow 82(c) from dilution horn pair 97 of the inner liner 52 may converge at a second mixing location 102 offset from the first mixing location 101. According to the present disclosure, the first mixing location 101 and the second mixing location 102 may be located circumferentially along the circumferential combustor centerline 93, but may be offset about the centerline 93 a distance D1 from one another. That is, each dilution horn pair 96, 97 is circumferentially spaced about the surface of their respective liners 52, 54, with respect to the engine centerline 12, so as to provide the air flow 82(c) as shown in FIG. 8

Figure 10:
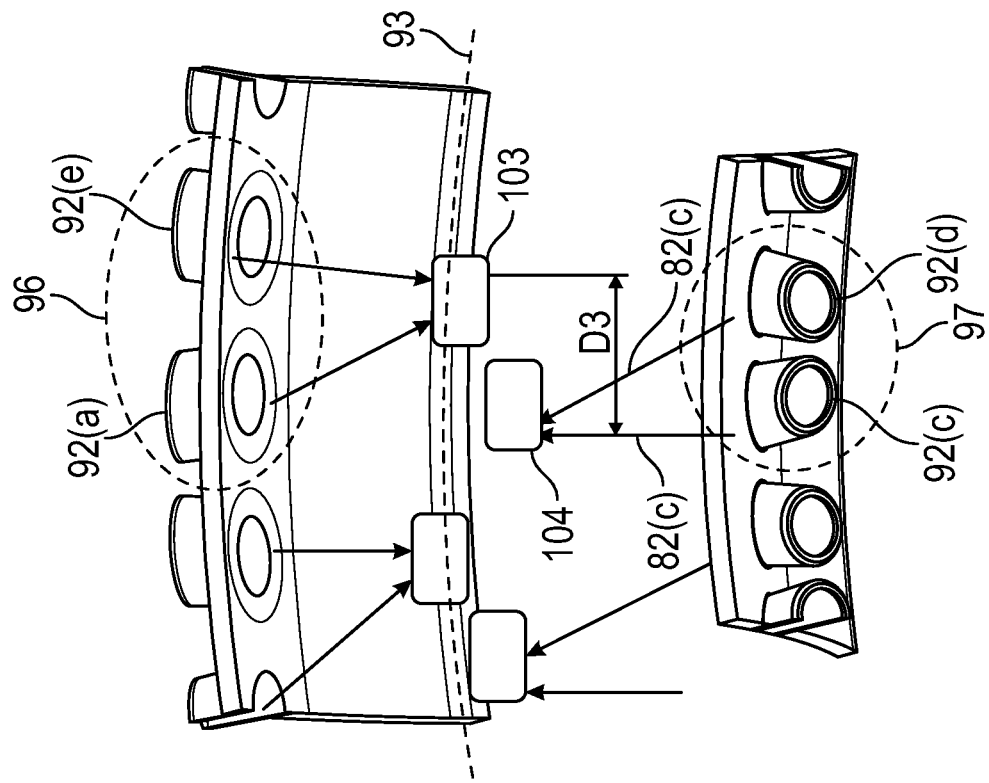
FIG. 10 is a cross-sectional view of an arrangement of dilution horns on inner and outer combustion liners, according to an embodiment of the present disclosure.
Figure 9:
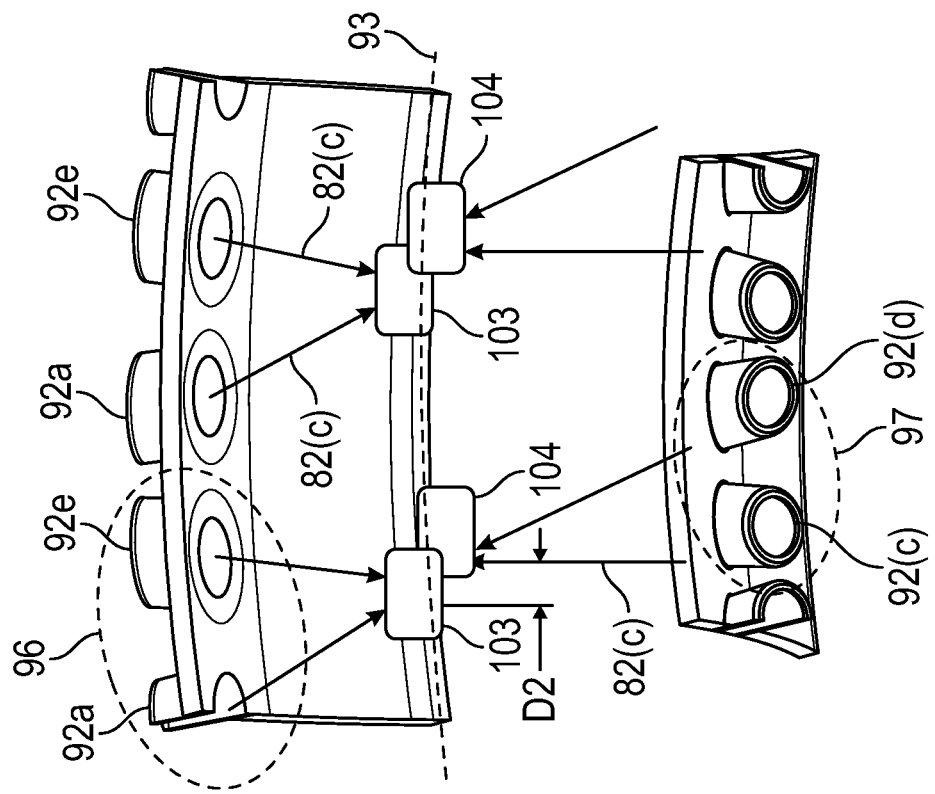
FIG. 9 is a cross-sectional view of an arrangement of dilution horns on inner and outer combustion liners, according to an embodiment of the present disclosure.

Referring now to FIGS. 9 and 10, depicted therein are further various alignments of dilution horn pairs arranged on the inner liner 52 with respect to dilution horn pairs arranged on the outer liner 54 so as to provide a desired mixing of the respective flows within the combustion chamber 62. In FIGS. 9 and 10, according to this aspect of the disclosure, a dilution pair 96 includes a dilution horn 92(a) that provides a lateral flow component of the air flow 82(c) into the combustion chamber, and a dilution horn 92(e). The dilution horn 92(e), rather than providing a lateral flow component, is arranged to provide a generally perpendicular flow into the combustion chamber 62. That is, the dilution horn 92(e) provides a flow of the air 82(c) directed generally perpendicular to the hot side surface 54(b) of outer liner 54 toward the engine centerline 12. The flow 82(c) from dilution horn 92(a) and the flow 82(c) from dilution horn 92(e) of the horn pair 97 in FIG. 9 converge with one another within the combustion chamber 62 at a mixing location 103. The mixing location 103 may be proximate to (i.e., at or adjacent to) the circumferential combustor centerline 93. A similar dilution horn pair 97 that includes dilution horns 92(d) and 92(f) is provided on the inner liner 52, and their respective flows 82(c) also converge on one another at a mixing location 104, where the mixing location 104 may also be proximate to the circumferential combustor centerline 93.

In one aspect of the present disclosure shown in FIG. 9, the circumferential arrangement and spacing of the dilution horn 92(e) of dilution horn pair 96 and the dilution horn 92(f) of the dilution horn pair 97 are generally radially aligned with one another such that their respective perpendicular oxidizer flows 82(c) are directed toward one another. In addition, the arrangement of FIG. 9 is such that the oxidizer flow 82(2) for dilution horn 92(a) of dilution horn pair 96 and the oxidizer flow 82(c) for dilution horn 92(d) of the dilution horn pair 97 are generally directed toward one another. Thus, this arrangement according to the present disclosure provides for a mixing location 103 for dilution horn pair 96 of outer liner 54 and a mixing location 104 for dilution horn pair 97 of inner liner 52. Mixing locations 103 and 104 may be proximate to (i.e., at or adjacent to) the circumferential combustor centerline 93, or may either be at a common mixing location (see 100 of FIG. 7), or may be offset about the centerline 93 a distance D2 from one another.

FIG. 10 depicts an arrangement of the same dilution horn pairs 96, 97 of FIG. 9, but with an alternative alignment of the dilution horn pairs on the inner liner 52 with respect to the outer liner 54. In FIG. 9, dilution horns 92(e), 92(f) are generally radially aligned. In contrast, in FIG. 10, dilution horn 92(e) is generally radially aligned with dilution horn 92(d). That is, dilution horn 92(e) on the outer liner 54, which provides a perpendicular flow of the oxidizer flow 82(c) into the combustion chamber, is opposed by dilution horn 92(d) on inner liner 54, which provides the lateral flow component for the oxidizer flow 82(c). Thus, the dilution horns 92(e) and 92(f), which provide the perpendicular flow, are radially offset from one another. This arrangement, according to the present disclosure, also provides for a mixing location 103 for dilution horn pair 96 of outer liner 54 and a mixing location 104 for dilution horn pair 97 of inner liner 52. Mixing locations 103 and 104 may be proximate to (i.e., at or adjacent to) the circumferential combustor centerline 93, but may be more offset from one another a distance D3 about the centerline 93 than that depicted in FIG. 9.

Figure 11:
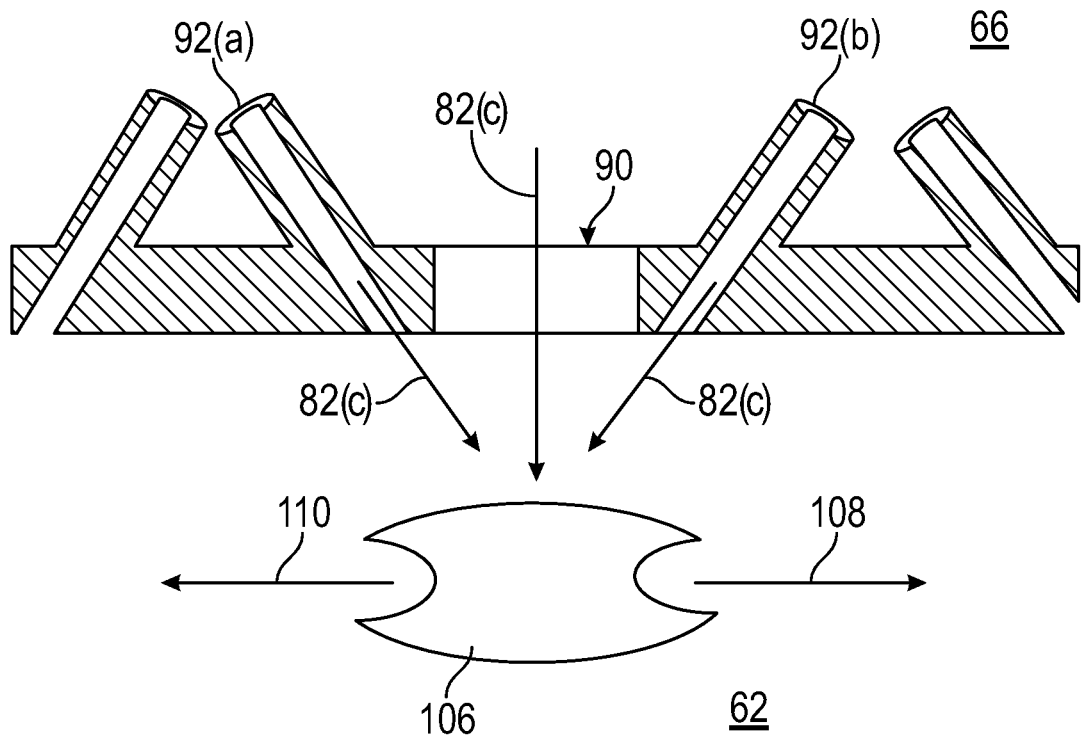
FIG. 11 depicts an example of a dilution horn pair in conjunction with a main jet, according to an embodiment of the present disclosure.

FIG. 11 depicts another dilution horn pair arrangement according to an aspect of the present disclosure. In FIG. 11, dilution horns 92(a) and 92(b), in an arrangement similar to that shown in FIG. 5 are provided so as to provide convergence of the oxidizer flow 82(c) therethrough. However, in the arrangement of FIG. 11, a main jet dilution hole 90 is provided between the dilution horns as part of the horn pair. That is, the dilution horn pair of the FIG. 11 arrangement includes not only the dilution horns 92(a), 92(b), but also includes the main jet dilution hole 90. In this arrangement, the main jet dilution hole 90, like the dilution horns 92(a), 92(b), provides a flow of oxidizer 82(c) from the outer flow passage 66 into the combustion chamber 62. Each of the flows 82(c) from the dilution horns 92(a), 92(b) and the main jet dilution hole 90 converge on one another in the combustion chamber 62 at a mixing location 106, which is located a given distance away from the hot side surface of the liner. The mixing of the air flows 82(c) in this arrangement results in lateral flows 108, 110 of the mixed oxidizer from the mixing location 106 about the combustion chamber. Thus, the dilution horns 92(a), 92(b) help to disperse the flow 82(c) of the main jet dilution hole 90 away from the hot side surface. Interaction of horn jets with the main dilution jet creates shear between the jets, resulting in increased turbulence levels and hence, better mixing of the dilution air with the primary zone combustion products. The horn jets push the main air jet away from the liner, resulting in higher jet penetration and hence, a lower temperature in the core region of the combustor.

Figure 12:
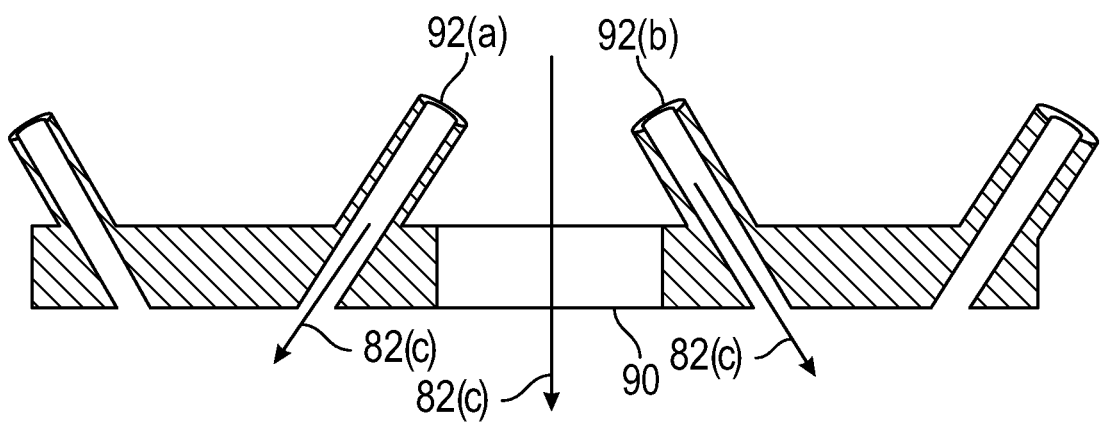
FIG. 12 depicts an example of a dilution horn pair in conjunction with a main jet, according to an embodiment of the present disclosure.

FIG. 12 depicts another dilution horn pair arrangement according to an aspect of the present disclosure. The arrangement of FIG. 12, similar to that shown in FIG. 11, includes a main jet dilution hole 90 utilized in conjunction with dilution horns. In FIG. 12, the arrangement includes a dilution horn pair that includes dilution horns 92(a) and 92(b) along with a main jet dilution hole 90 between the dilution horns 92(a) and 92(b). In this arrangement according to the present disclosure, the dilution horn 92(a) and the dilution horn 92(b) are arranged to provide their respective oxidizer flows 82(c) diverging away from the flow 82(c) of the main jet dilution hole 90. Thus, the arrangement of FIG. 12 employs diverging dilution horns in conjunction with a main jet dilution hole 90 being disposed between the dilution horns. This arrangement reduces the hot gas temperature present between the main dilution air jets, thereby reducing NOx emissions.

Figure 13:
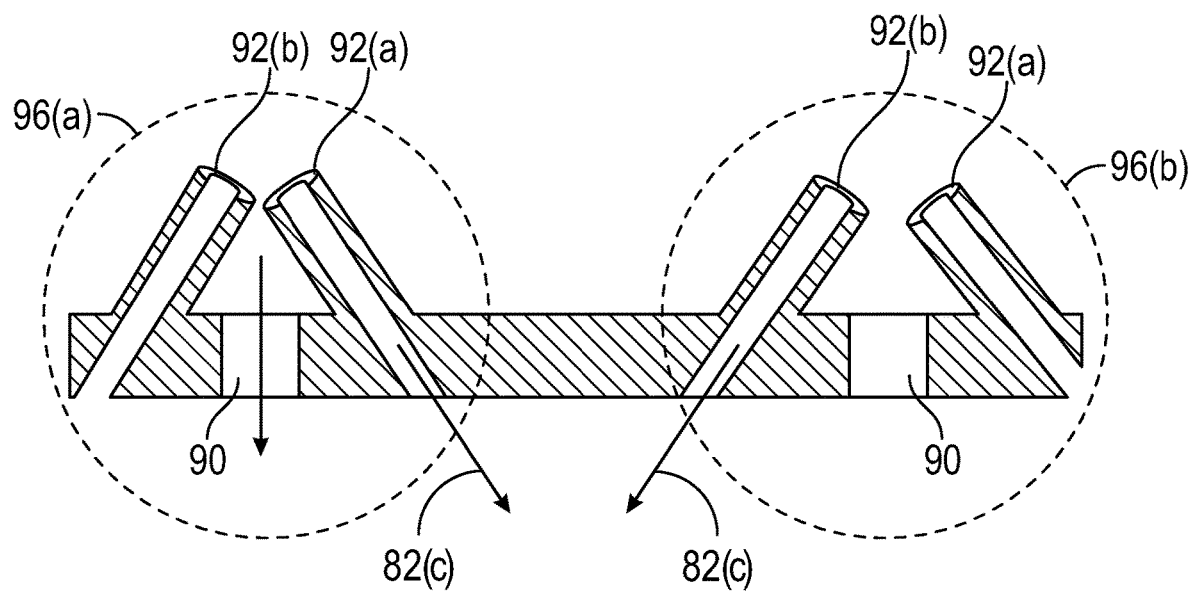
FIG. 13 depicts an example of a dilution horn pair, according to an embodiment of the present disclosure.

FIG. 13 depicts a similar dilution horn arrangement as that shown in FIG. 12 (i.e., a main jet dilution hole between two diverging flow dilution horns). In FIG. 13, however, interaction between adjacent horn pairs 96(a), 96(b) is depicted where, for example, the diverging oxidizer flow 82(c) from dilution horn 92(a) of dilution horn pair 96(a) converges with the oxidizer flow 82(c) from dilution horn 92(b) of dilution horn pair 96(b). Thus, while there may be diverging oxidizer flow with respect to the main jet dilution holes 90 in each of the dilution pairs 96(a), 96(b), there may be converging flows between dilution horns of adjacent dilution horn pairs.

Figure 14:
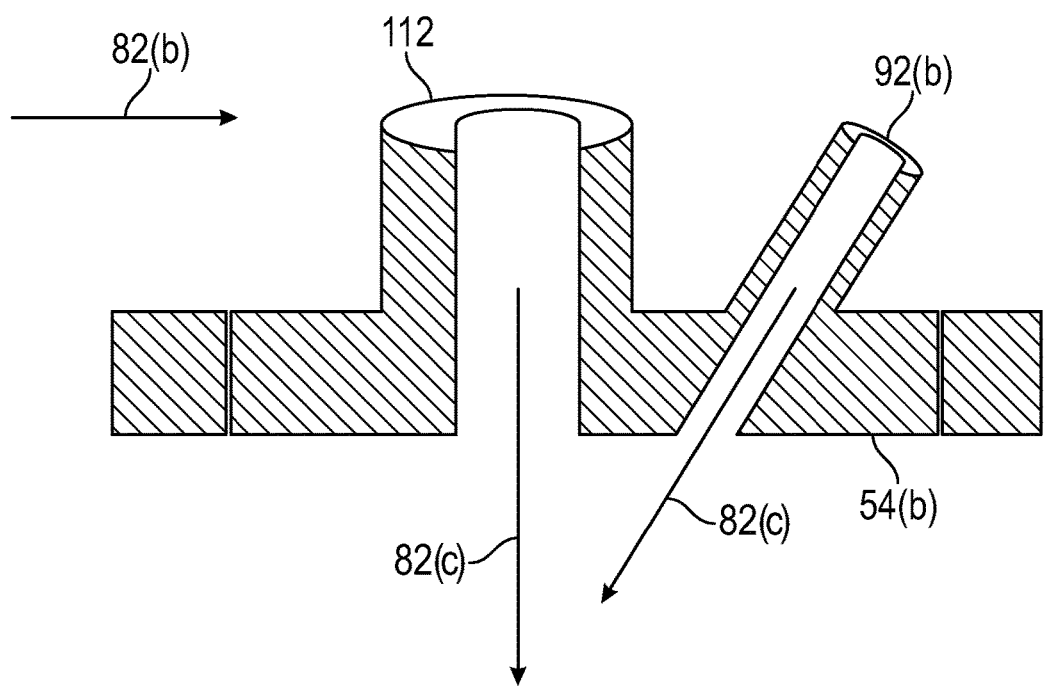
FIG. 14 depicts an example of a dilution horn pair in conjunction with a main jet, according to an embodiment of the present disclosure.

FIG. 14 depicts another arrangement of a dilution horn pair according to the present disclosure. In FIG. 14, the dilution horn pair can be seen to includes a dilution horn 92(b) in conjunction with a dilution horn 112. Here, the dilution horn 92(b) provides a flow of oxidizer 82(c) from the outer flow passage 66 into the combustion chamber 52. That is, the dilution horn 92(b) is arranged behind the dilution horn 112 at an angle similar to that of the dilution horn 92(b) of FIG. 5. The dilution horn 112 of FIG. 14, however, is seen to provide a generally perpendicular (i.e., orthogonal) oxidizer flow 82(c) into the combustion chamber 62. That is, the oxidizer flow 82(c) through dilution horn 112 may be directed perpendicular to the hot side surface 54(b) of outer liner 54 into the combustion chamber 62 without a lateral flow component of the air flow 82(c). The oxidizer flow 82(c) from the dilution horn 92(b) and the oxidizer flow 82(c) through the dilution horn 112 are seen to converge on one another at a mixing location away from the hot side surface 54(b) of the outer liner 54. The dilution horn 112 seen in FIG. 14 may include a larger diameter flow passage therethrough than a diameter of the flow passage 94 of dilution horn 92(b). According to the present disclosure, the dilution horn 112 may be an extension of a main jet dilution hole 90 extending into the outer flow passage 66 like the dilution horn 92(b). Flow from Dilution horn 92(b) provides hydraulic support to the flow from dilution horn 112, thereby increasing the penetration of the flow jet from dilution horn 112. This increase in penetration of jet causes the dilution flow from dilution horn 112 to reach the core region of the combustor and to reduce the temperature, thereby reducing NOx emissions. Additionally, the flow from dilution horn 92(b) impinges on the flow from dilution horn 112, causing it to spread in the lateral direction. This also reduces the temperature in the lateral direction and further reduces the NOx emissions.

Figure 15:
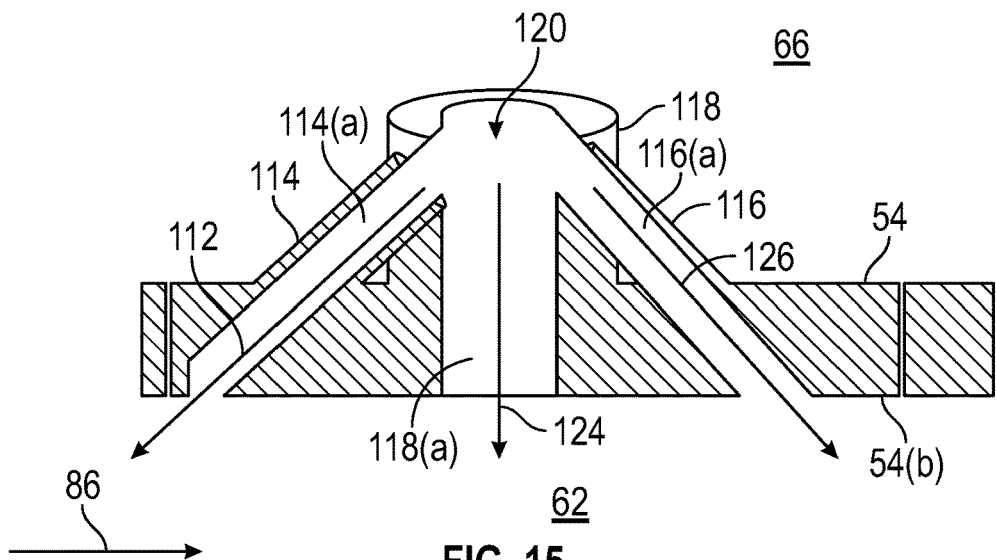
FIG. 15 depicts an example of dilution horn pairs with main jets, according to an embodiment of the present disclosure.

FIG. 15 depicts another arrangement of a dilution horn pair according to the present disclosure. In FIG. 15, a dilution horn pair is seen to include a dilution horn 114, a dilution horn 116, and a dilution horn 118. Each of dilution horn 114, 116, 118 includes a flow passage therethrough to provide a flow of the oxidizer from the outer flow passage 66 into the combustion chamber 62. Each of the dilution horns 114, 116 and 118 is formed with a common inlet port 120. From the common inlet port 120 however, dilution horn 118 has a flow passage 118(a) extending from the common inlet port 120 generally perpendicular (i.e., orthogonal) to the hot side surface 54(b) of the outer liner 54. The dilution horn 114 has a flow passage 114(a) extending from the common inlet port 120 and diverging away from the flow passage 118(*a*) into the combustion chamber 62. Similarly, dilution horn 116 has a flow passage 116(*a*) extending from the common inlet port 120 and diverging away from the flow passage 118(*a*) in a direction opposite to that of the flow passage 114(*a*) of dilution horn 114. Each oxidizer flow 82(*c*) from the dilution horns 114, 116, and 118 mixes with the flow of combustion gases 86 in the combustion chamber 62, with the dilution horns 114 and 116 providing a lateral flow component of their respective oxidizer flows 82(*c*).

Figure 16:
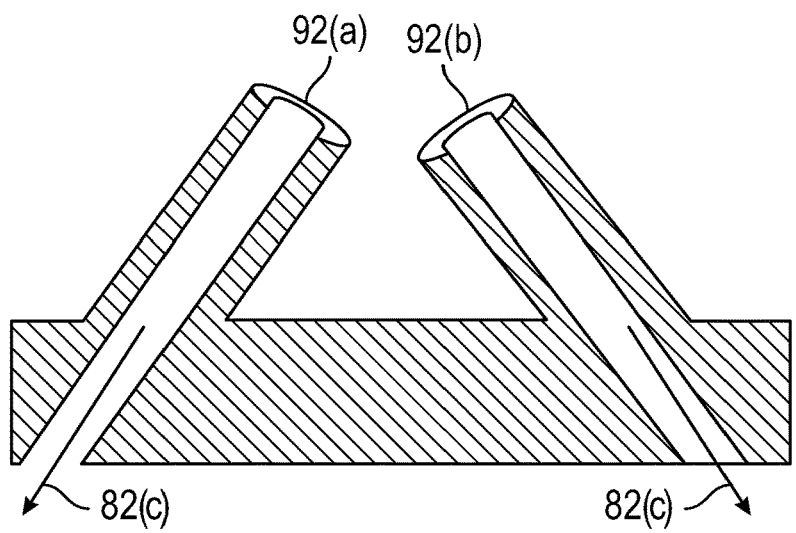
FIG. 16 depicts a diverging flow dilution horn pair, according to an embodiment of the present disclosure.

FIG. 16 depicts another arrangement of dilution horns 92(*a*), 92(*b*) in a dilution horn pair according to an aspect of the present disclosure. In FIG. 16, the arrangement is similar to that of FIG. 12, but omits the main jet dilution hole 90. Thus, the dilution horn pair of FIG. 16 provides for diverging flow of the oxidizer flow 82(*c*) from each of the dilution horns 92(*a*), 92(*b*).

Figure 3B:
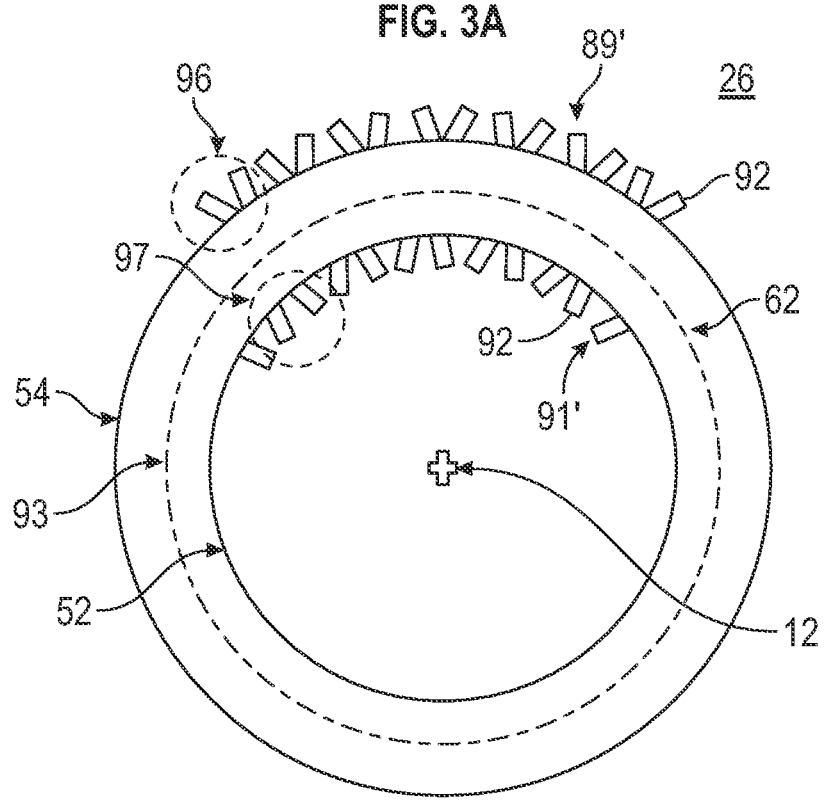
FIG. 3B is a cross sectional view through the annular combustor, taken at plane 3B-3B of FIG. 1, according to an embodiment of the present disclosure.

In each of the above-described arrangements of the dilution horn pairs, the dilution horn pairs are described as being located about the outer circumference of the outer liner, or about the inner circumference of the inner liner, in a same plane taken through the respective liners at a given distance along a flow direction of the annular combustor. Thus, the dilution horns may be formed in a ring arrangement about the liners. The foregoing description depicted one example where a single circumferential ring of dilution horn pairs 96, 97 located at, for example, plane 3-3 (FIGS. 2 and 3) are implemented about the circumference of the outer liner 54 and the inner liner 52. However, it can be appreciated that multiple circumferential rings of dilution horn pairs 96, 97 may be implemented instead, where each ring may be located about the circumferences of the outer liner 54 and the inner liner 52 at different axial locations. For example, as shown in FIG. 3A, a first ring 89 of dilution horns 96 may be included at plane 3A-3A on the outer liner 54 and a first ring 91 of dilution horn pairs 97 may be included at plane 3A-3A on the inner liner 52. In addition, as shown in FIG. 3B, taken at plane 3B-3B of FIG. 1, a second ring 89' of dilution horn pairs 96 may be included on the outer liner 54 at the plane 3B-3B, which is parallel to plane 3A-3A, but located axially further downstream or upstream from plane 3A-3A. Similarly, a second ring 91' of dilution horn pairs 96 may be included on the inner liner 52 at plane 3B-3B. Thus, the foregoing description of a single ring of dilution horns on the combustion liner is merely one example embodiment.

It can also be appreciated that any one ring of dilution horn pairs need not include the same dilution horn pair entirely about the entire circumference of the liner in the same ring. Instead, one or more of the above-described dilution horn pair embodiments may be mixed among the dilution horn pairs implemented about the circumference of the liner for any one ring. This would apply equally where, for example, multiple rings of dilution horn pairs are implemented, where, for example, a first ring may include one type of dilution horn pairs (e.g., converging flow dilution horn pairs of FIG. 5), and a second ring of dilution horn pairs located further downstream on the liner may include another type of dilution horn pairs (e.g., diverging flow dilution horn pairs of FIG. 16).

Figure 17:
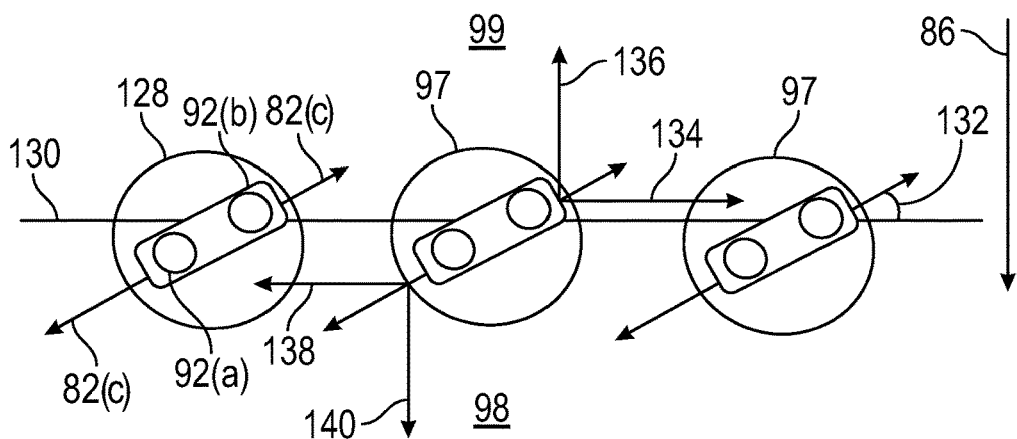
FIG. 17 depicts an angled arrangement of dilution horn pairs, according to an embodiment of the present disclosure.

Referring now to FIG. 17, the foregoing concept of providing oxidizer flow from dilution horns in other than the same plane will be described. In the description above, dilution horn pairs were depicted as providing the lateral oxidizer flow 82(*c*) in the same plane. That is, as shown in FIGS. 7 to 10, for example, the oxidizer flows 82(*c*) from each dilution horn of the dilution horn pairs 96, 97 are projected laterally along the same plane 3-3. In FIG. 17, however, the dilution horn pair may be arranged to provide oxidizer flow in a manner other than in the same plane. For example, a diverging flow dilution horn pair 97 (FIG. 16) may be implemented to provide both a lateral component of the oxidizer flow and an axial component of the oxidizer flow. In FIG. 17, a diverging dilution horn pair 97 is seen to be formed as part of an insert 128 (described below). On the inner liner 52 and/or the outer liner 54, holes may be formed along plane 3-3 for installing the insert 128. In the above-described embodiment in which the lateral flow is provided in the same plane 3-3, the inserts may be installed so that the dilution horns align with plane 3-3 to provide the lateral flow of the oxidizer 82(*c*) in the same plane 3-3. In FIG. 17, however, the inserts 128 are seen as being rotated so that the dilution horns do not line up with plane 130 (corresponding to plane 303) and, therefore, the lateral flow of the oxidizer flow 82(*c*) is not directed solely along plane 130, but is directed at an angle 132 (e.g., thirty degrees) with respect to the plane 130. Thus, the diverging oxidizer flows 82(*c*) provide both a lateral component crossing the axial combustion gas 86 flow direction, but also provide an axial component of the oxidizer flow 82(*c*).

As can be seen in FIG. 17, for example, a dilution horn 92(*b*) of the dilution horn pair 97 may provide a lateral component 134 of the oxidizer flow 82(*c*) (directed to the right in the figure) and may also provide an axial component 136 of the oxidizer flow 82(*c*) directed toward the upstream end 99 of the combustion chamber (i.e., against the combustion gas 86 axial flow direction). On the other hand, a dilution horn 92(*a*) of the dilution horn pair 97 may provide a lateral component 138 of the oxidizer flow 82(*c*) (directed to the left in the figure) and may also provide an axial component 140 of the oxidizer flow 82(*c*) directed toward the downstream end 98 of the combustion chamber (i.e., in the same direction as the combustion gas 86 axial flow direction). Thus, the arrangement of FIG. 17 may provide for better mixing of the oxidizer flow 82(*c*) from the dilution horn pair with the combustion gases 86, thereby reducing NOx emissions.

Figure 18:
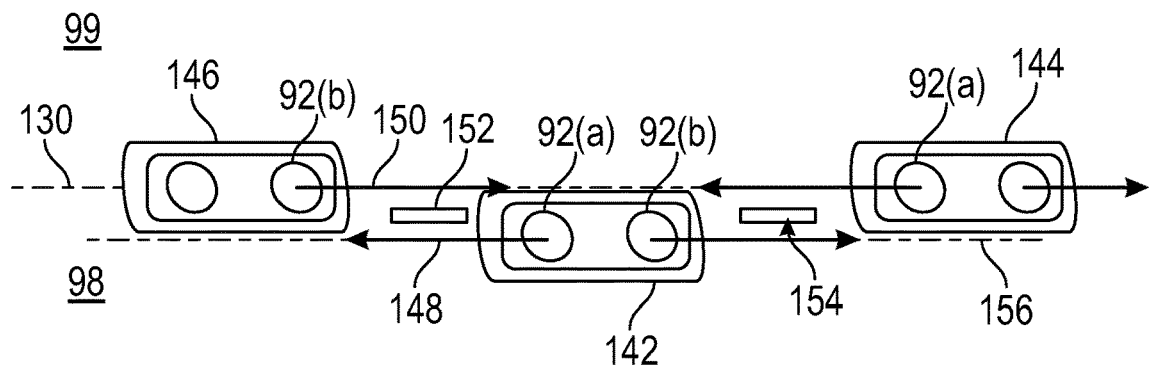
FIG. 18 depicts a multi-ring arrangement of dilution horn pairs, according to an embodiment of the present disclosure.

As was discussed above, multiple rings of dilution horn pairs may be implemented, with each ring being located about the circumference of the respective liner at a plane having a different axial location along the liner. FIG. 18 depicts an arrangement where multiple rings of dilution horn pairs are implemented, with the dilution horn pairs of one ring acting in concert with the dilution horn pairs of another ring. In FIG. 18, diverging dilution horn pairs similar to those of FIG. 16 are shown implemented working in concert with one another. A first ring of dilution horn pairs is shown located about the circumference of the liner at plane 130 (corresponding to plane 3-3), and a second ring of dilution horn pairs is shown located on a downstream side of plane 130 at plane 156. In the figure, dilution horn pairs 146 and 144 are shown located at plane 130, and dilution horn pair 142 is shown located at plane 156. Each of the dilution horn pairs 142, 144, and 146 provide diverging oxidizer flow of the oxidizer 82(*c*) into the combustion chamber 62. For dilution horn pair 146, oxidizer flow 150 represents the oxidizer flow 82(*c*) from dilution horn 92(*b*). In dilution horn pair 142, oxidizer flow 148 represents the oxidizer flow 82(*c*) from dilution horn 92(*a*). The planes 130, 156 are arranged close to one another in the axial direction so that the oxidizer flows 150, 148 impinge on one another to generate a shear component 152 between the two flows. A similar shear component 154 is seen being generated between the respective flows between dilution horn pair 142 and dilution horn pair 144. The shear component of such an arrangement helps to provide even further mixing of the dilution oxidizer flow within the combustion chamber.

Figure 19:
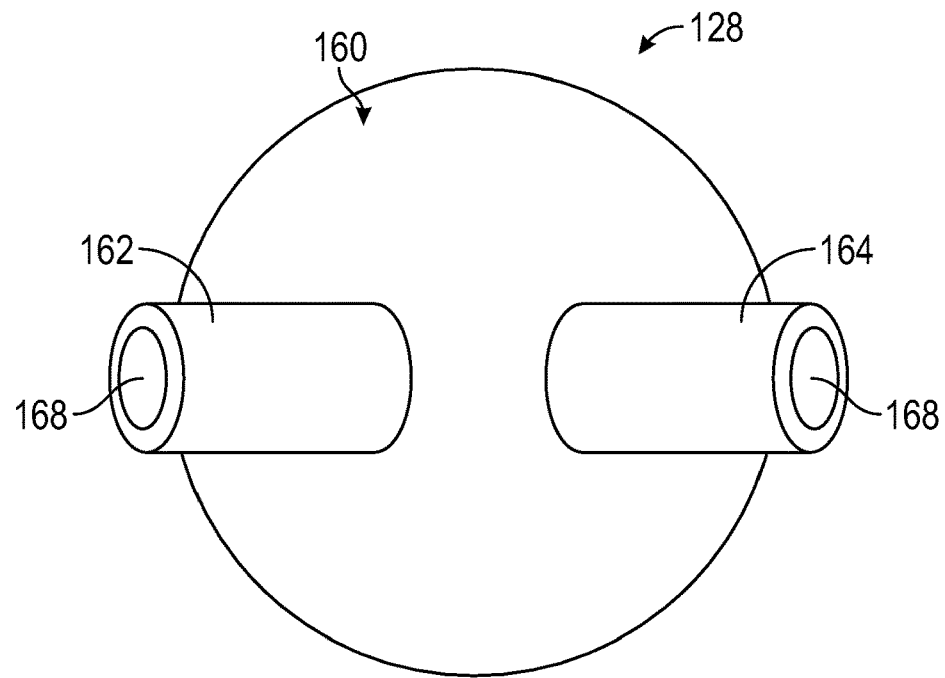
FIG. 19 is a top view of one example insert of a dilution horn pair, according to an embodiment of the present disclosure.
Figure 20:
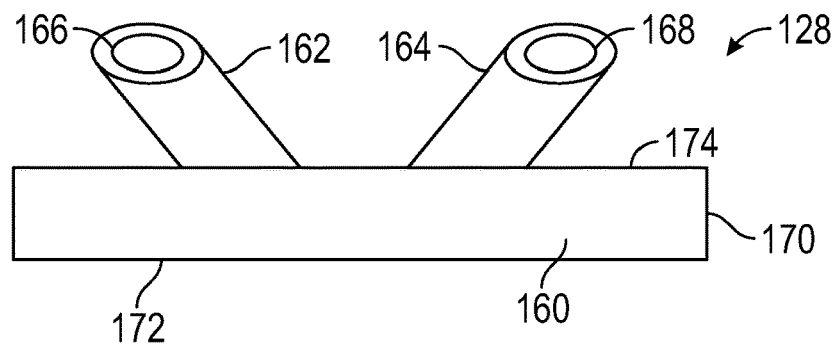
FIG. 20 is an aft looking view of one example insert of a dilution horn pair, according to an embodiment of the present disclosure.

As was briefly mentioned above, a dilution horn pair may be implemented via an insert, which may also be referred to herein as a dilution horn pair component. Referring to FIGS. 19 and 20, depicted therein is a top view (FIG. 19) and an aft looking side view (FIG. 20) of an example dilution horn insert according to an embodiment of the present disclosure. In the example insert, a converging oxidizer flow (FIG. 5) for a dilution horn pair is depicted. Of course, other embodiments described herein for dilution horn pairs may also be implanted via an insert as well. The insert (i.e., horn pair component) can be seen to include a base 160 having a cold side surface 174 and a hot side surface 172. As shown in FIGS. 19 and 20, the base may have a cylindrical shaped body so as to fit within a dilution insert hole (not shown) of the inner liner 52 and/or the outer liner 54. The base 160 can also be seen to include, about the outer circumference of the cylindrical shaped body, a fastening surface 170. The fastening surface 170 may be a smooth surface that will form either a slip-fit or an interference fit with the hole in the liner, and then may be mounted to the liner via, for example, a weld. Of course, other manufacturing techniques for installing an insert into a hole may be implemented, including providing threads along the fastening surface 170 to engage with corresponding threads in the hole of the liner.

Formed with the base is a dilution horn pair, which may constitute any of the above-described embodiments of dilution horn pairs. In FIGS. 19 and 20, a converging flow dilution horn pair, such as that shown in FIG. 5, is included with the base 160. Here, a first dilution horn (oxidizer inlet horn) 162 is connected to the base 160 and a second dilution horn (second oxidizer inlet horn) 164 is connected to the base 160. As shown in the figures, dilution horns 162, 164 are cylindrical in shape, but, of course, the shape is not limited to being cylindrical and other shapes may be employed instead. The dilution horns 162, 164 are connected to the base so as to form the converging flow relationship between them. Of course, the dilution horns 162, 164 may be connected to the base to form any of the other embodiments described herein, including a diverging flow relationship.

Dilution horn 162 is formed so as to have a flow passage 166 therethrough, and dilution horn 164 is formed so as to have a flow passage 168 therethrough. These are similar to the flow passage 94 shown in FIG. 6, and form a passage for which an oxidizer is passed from the outer chamber 66 to the combustion chamber 62. The flow passages 166, 168 are generally formed as a concentric cylindrical flow passages along a central axis of the dilution horn through the dilution horns 162, 164. Referring back to FIG. 6, as seen therein, the distal end of each of the dilution horns 162, 164 may be formed at an angle so as to provide for better capture of the air flow 82(a) within the outer flow passage 66 into the dilution horn flow passages 166, 168. The dilution horn insert 128 may be formed as separate components and assembled accordingly, or may be manufactured as a single component part, such as via additive manufacturing processes.

The foregoing description mainly focused on various aspects of dilution horn pair structures and how to provide for lateral flow of an oxidizer in a dilution zone of the combustion chamber via the dilution horn pairs. The present disclosure, however, also provides for a method of providing dilution in a gas turbine engine. More specifically, in the gas turbine engine 10, the combustor 26 has an annular inner liner 52 and an annular outer liner 54 forming a combustion chamber 62 therebetween, and an outer flow passage 66 surrounds the annular inner liner 52 and the annular outer liner 54. In the method of the present disclosure, a flow of combustion gases 86 is provided within the combustion chamber 62 from a primary combustion zone 62(a) to a dilution zone 62(b) downstream of the primary combustion zone in the combustion chamber 62. As has been described above, the oxidizer flow 82(a) enters the combustion chamber 62, mixes with a flow of fuel ejected from fuel nozzle 70, and is ignited to form combustion gases 86. The combustion gases 86 generally flow in an axial direction in relation to the engine centerline 12 through the combustion chamber 62 to the HP turbine inlet 68. As described herein, a flow of the oxidizer gas 82(b) enters the outer flow passage 66. Downstream of the primary combustion zone 62(a), at the dilution zone 62(b), a portion of the oxidizer gas 82(b) is diverted via dilution horns into the combustion chamber. Here, the dilution horns are formed as dilution horn pairs, where a first dilution horn of the pair provides a first portion of the flow of oxidizer gas from the outer flow passage into the combustion chamber within the dilution zone, and a second dilution horn of the dilution horn pair provides a second portion of the flow of oxidizer gas from the outer flow passage into the combustion chamber within the dilution zone. The first and second dilution horns of the dilution horn pair are in arrangement with one another so as to provide their respective flows of oxidizer gas into the dilution zone of the combustion chamber with a lateral flow component, where the lateral flow component is a flow direction extending across the axial direction. That is, the flow of oxidizer in the dilution zone of the combustion chamber from the dilution horn pairs impinges on one another and impinges on the combustion gases deeper within the combustion chamber so as to provide for lower NOx emissions. This is due to the better mixing of the dilution oxidizer gas with the combustion gases due to the improved turbulence created by interaction of the dilution jets from the dilution horn pairs. In addition, the dilution oxidizer gas being provided deeper within the combustion chamber and away from the surface of combustion liner helps to improve the durability of the combustion liner around the dilution horn pair ports. Further, the arrangement provides for mixing of the oxidizer flow from the dilution horn pairs on the inner liner with the oxidizer flow from the dilution horn pairs on the outer liner.

While the foregoing description relates generally to a gas turbine engine, it can readily be understood that the gas turbine engine may be implemented in various environments. For example, the engine may be implemented in an aircraft, but may also be implemented in non-aircraft applications such as power generating stations, marine applications, or oil and gas production applications. Thus, the present disclosure is not limited to use in aircraft.

Further aspects of the present disclosure are provided by the subject matter of the following clauses.

A combustor for a gas turbine engine, the combustor comprising: an annular inner liner having a cold surface side and a hot surface side; an annular outer liner having a cold surface side and a hot surface side; a combustion chamber formed between the hot surface side of the annular inner liner and the hot surface side of the annular outer liner, the combustion chamber providing for a flow of combustion gases in an axial flow direction from an upstream end of the combustion chamber to a downstream end of the combustion chamber; a first oxidizer inlet horn that provides a flow of an oxidizer gas therethrough from a cold side oxidizer flow passage of the combustor into the combustion chamber; and a second oxidizer inlet horn that provides a flow of the oxidizer gas therethrough from the cold side oxidizer flow passage of the combustor into the combustion chamber, wherein: the first oxidizer inlet horn and the second oxidizer inlet horn are arranged as a horn pair, the horn pair is arranged on at least one of the annular inner liner and the annular outer liner, and at least one of the first oxidizer inlet horn and the second oxidizer inlet horn of the horn pair is arranged to provide a lateral flow component of their respective flow of oxidizer gas therethrough into the combustion chamber, the lateral flow component comprising a flow direction extending laterally across and non-orthogonal to the axial flow direction of the combustion chamber.

The combustor according to any preceding clause, wherein the horn pair is arranged to project the flow of oxidizer gas from the first oxidizer inlet horn and from the second oxidizer inlet horn to a median portion of the combustion chamber between the annular inner liner and the annular outer liner.

The combustor according to any preceding clause, wherein both the first oxidizer inlet horn and the second oxidizer inlet horn of the horn pair are arranged to provide the lateral flow component, and wherein the first oxidizer inlet horn and the second oxidizer inlet horn of the horn pair are arranged to provide their respective lateral flow components converging on one another.

The combustor according to any preceding clause, wherein both the first oxidizer inlet horn and the second oxidizer inlet horn of the horn pair are arranged to provide the lateral flow component, and wherein the first oxidizer inlet horn and the second oxidizer inlet horn of the horn pair are arranged to provide their respective lateral flow components diverging from one another.

The combustor according to any preceding clause, wherein the first oxidizer inlet horn of the horn pair is arranged to provide its respective flow of oxidizer gas into the combustion chamber in a direction perpendicular toward the axial flow direction of the combustor, and the second oxidizer inlet horn of the horn pair is arranged to provide the lateral flow component of the oxidizer gas into the combustion chamber in a direction converging on the flow of oxidizer gas of the first inlet horn.

The combustor according to any preceding clause, further comprising an oxidizer inlet jet between the first oxidizer inlet horn and the second oxidizer inlet horn of the horn pair, wherein the oxidizer inlet jet is arranged to provide a flow of the oxidizer gas therethrough from the cold side oxidizer flow passage of the combustor into the combustion chamber, the flow of oxidizer gas through the oxidizer inlet jet being perpendicular toward the axial flow direction, and wherein the respective lateral flow components of the first inlet horn and the second inlet horn of the horn pair are arranged to further converge with the oxidizer flow of the oxidizer inlet jet in the combustion chamber.

The combustor according to any preceding clause, further comprising an oxidizer inlet jet between the first oxidizer inlet horn and the second oxidizer inlet horn of the horn pair, wherein the oxidizer inlet jet is arranged to provide a flow of the oxidizer gas therethrough from the cold side oxidizer flow passage of the combustor into the combustion chamber, the flow of oxidizer gas through the oxidizer inlet jet being perpendicular toward the axial flow direction, and wherein the respective lateral flow components of the first oxidizer inlet horn and the second oxidizer inlet horn of the horn pair are arranged to further diverge from the oxidizer flow of the oxidizer inlet jet in the combustion chamber.

The combustor according to any preceding clause, wherein a first horn pair is arranged on the annular outer liner, and a second horn pair is arranged on the annular inner liner, wherein the first horn pair is arranged to project the flow of oxidizer gas from the first oxidizer inlet horn and from the second oxidizer inlet horn of the first horn pair to a mixing location at a median portion of the combustion chamber between the annular inner liner and the annular outer liner, and wherein the second horn pair is arranged to project the flow of oxidizer gas from the first oxidizer inlet horn and from the second oxidizer inlet horn of the second horn pair to the mixing location at the median portion of the combustion chamber between the annular inner liner and the annular outer liner.

The combustor according to any preceding clause, wherein a first horn pair is arranged on the annular outer liner, and a second horn pair is arranged on the annular inner liner, wherein the first horn pair is arranged to project the flow of oxidizer gas from the first oxidizer inlet horn and from the second oxidizer inlet horn of the first horn pair to a first mixing location at a first median portion of the combustion chamber between the annular inner liner and the annular outer liner, and wherein the second horn pair is arranged to project the flow of oxidizer gas from the first oxidizer inlet horn and from the second oxidizer inlet horn of the second horn pair to a second mixing location at a second median portion of the combustion chamber between the annular inner liner and the annular outer liner.

The combustor according to any preceding clause, wherein the first median portion and the second median portion are substantially on a circumferential centerline of the combustion chamber taken between the annular inner liner and the annular outer liner, and the first median portion and the second median portion are offset from one another in a circumferential direction along the circumferential centerline.

The combustor according to any preceding clause, wherein, in both the first horn pair and the second horn pair, the respective first oxidizer inlet horn is arranged to provide its respective flow of oxidizer gas into the combustion chamber in a direction perpendicular toward the axial flow direction of the combustor, and the respective second oxidizer inlet horn of the horn pair is arranged to provide the lateral flow component of the oxidizer gas into the combustion chamber in a direction converging on the flow of oxidizer gas of the first oxidizer inlet horn.

The combustor according to any preceding clause, wherein each of the first oxidizer inlet horn and the second oxidizer inlet horn comprises a horn body having an oxidizer flow passage that provides the flow of oxidizer gas therethrough, the horn body having a proximal end adjacent to at least one of a respective hot side surface of the annular inner liner and the annular outer liner, and a distal end extending from a respective cold side surface of at least one of the annular inner liner and the annular outer liner into the cold side oxidizer flow passage of the combustor.

The combustor according to any preceding clause, wherein the distal end of the horn body further comprises an oxidizer flow passage inlet, the oxidizer flow passage inlet having an upstream portion and a downstream portion, wherein the downstream portion of the oxidizer flow passage inlet extends further into the cold side oxidizer flow passage than does the upstream portion of the oxidizer flow passage inlet.

The combustor according to any preceding clause, further comprising a third oxidizer inlet horn that provides a flow of the oxidizer gas therethrough from the cold side oxidizer flow passage into the combustion chamber, wherein the third oxidizer inlet horn is arranged in the horn pair with the first oxidizer inlet horn and the second oxidizer inlet horn such that the first oxidizer inlet horn, the second oxidizer inlet horn, and the third oxidizer inlet horn share a common inlet.

The combustor according to any preceding clause, wherein both the first oxidizer inlet horn and the second oxidizer inlet horn of the horn pair are arranged to provide the lateral flow component, and are arranged to provide their respective lateral flow components diverging from one another, and wherein the third oxidizer is arranged between the first oxidizer inlet horn and the second oxidizer inlet horn, and is arranged to provide its flow of oxidizer gas into the combustion chamber in a direction perpendicular towards the axial flow direction of the combustor.

The combustor according to any preceding clause, further comprising a plurality of horn pairs arranged on at least one of the annular inner liner and the annular outer liner, wherein the first oxidizer inlet horn and the second oxidizer inlet horn of each respective horn pair among the plurality of horn pairs are arranged along a same circumference around at least one of the annular inner liner and the annular outer liner, and a same axial distance from at least one of an upstream end of the annular inner liner and the annular outer liner.

The combustor according to any preceding clause, wherein at least one of the first oxidizer inlet horn and the second oxidizer inlet horn is arranged to provide both the lateral flow component of the oxidizer gas into the combustion chamber and an axial flow component of the oxidizer gas into the combustion chamber, the axial flow component corresponding to the axial flow direction of the combustion gases in the combustion chamber.

The combustor according to any preceding clause, further comprising a first horn pair and a second horn pair each arranged on one of the annular inner liner or the annular outer liner, wherein the first oxidizer inlet horn and the second oxidizer inlet horn of both the first and second horn pairs are arranged to provide their respective lateral flow components diverging from one another, wherein the first horn pair is arranged at a first distance in the axial flow direction from the upstream end of the combustion chamber, and the second horn pair is arranged at a second distance greater than the first distance in the axial flow direction from the upstream end of the combustion chamber, wherein the first horn pair and the second horn pair are arranged circumferentially offset from one another, and wherein the first horn pair and the second horn pair are arranged so that the lateral flow component of the oxidizer flow from one of first oxidizer inlet horn and the second oxidizer inlet horn of the first horn pair, and the lateral flow component of the oxidizer flow from one of the first oxidizer inlet horn and the second oxidizer inlet horn of the second horn pair, are adjacent to one another in opposing directions and provide an oxidizer flow-shear between their respective lateral flow components.

A dilution horn pair component for a combustor of a gas turbine engine, the horn component comprising: a base having a cold side surface and a hot side surface; a first oxidizer inlet horn connected to the base, the first oxidizer inlet horn having an axial passage therethrough from a distal end of the first oxidizer inlet horn to a proximal end of the first oxidizer inlet horn extending through the hot side surface of the base; and a second oxidizer inlet horn connected to the base, the second oxidizer inlet horn having an axial passage therethrough extending from a distal end of the second oxidizer inlet horn to a proximal end of the second oxidizer inlet horn extending through the hot side surface of the base, wherein the first oxidizer inlet horn and the second oxidizer inlet horn are arranged on the base such that an axis of the axial flow passage of the first oxidizer inlet horn and an axis of the axial flow passage of the second oxidizer inlet horn converge at a given distance from the hot side surface of the base.

The horn pair component according to any preceding clause, wherein the base further comprises a main jet inlet having a main jet flow passage therethrough extending from the cold side surface of the base to the hot side surface of the base, wherein the main jet inlet is arranged between the first oxidizer inlet horn and the second oxidizer inlet horn.

The horn pair component according to any preceding clause, wherein the main jet inlet is arranged such that an axis of the main jet flow passage converges at the given distance with the axis of the axial flow passage of the first oxidizer inlet horn, and the axis of the axial flow passage of the second oxidizer inlet horn.

A method of providing dilution in a gas turbine engine, the gas turbine engine comprising a combustor having an annular inner liner and an annular outer liner forming a combustion chamber therebetween, and an outer flow passage surrounding the annular inner liner and the annular outer liner, the method comprising: providing a flow of combustion gases within the combustion chamber from a primary combustion zone to a dilution zone downstream of the primary combustion zone in the combustion chamber, the flow of combustion gases being in an axial direction with respect to a longitudinal center axis of the gas turbine engine; providing a flow of an oxidizer gas in the axial direction through the outer flow passage; providing, via a first dilution horn, a first portion of the flow of oxidizer gas from the outer flow passage into the combustion chamber within the dilution zone; and providing, via a second dilution horn, a second portion of the flow of oxidizer gas from the outer flow passage into the combustion chamber within the dilution zone, wherein at least one of the first dilution horn and the second dilution horn provides their respective flows of at least one of the first portion of the flow of oxidizer gas and the second portion of the flow of the oxidizer gas into the dilution zone of the combustion chamber with a lateral flow component, the lateral flow component having a flow direction extending laterally across and non-orthogonal to the axial direction.

Although the foregoing description is directed to the preferred embodiments of the disclosure, it is noted that other variations and modifications will be apparent to those skilled in the art, and may be made without departing from the spirit or scope of the disclosure. Moreover, features described in connection with one embodiment of the disclosure may be used in conjunction with other embodiments, even if not explicitly stated above.

What is claimed is:

1. A combustor for a gas turbine engine, the combustor comprising:
an annular inner liner having an inner liner cold surface side adjacent to an inner flow passage surrounding the inner liner and an inner liner hot surface side adjacent to a combustion chamber;
an annular outer liner having an outer liner cold surface side adjacent to an outer flow passage surrounding the outer liner and an outer liner hot surface side adjacent to the combustion chamber;
the combustion chamber formed between the inner liner hot surface side and the outer liner hot surface side, the combustion chamber providing for a flow of combustion gases in an axial flow direction from an upstream end of the combustion chamber to a downstream end of the combustion chamber; and a plurality of oxidizer inlet horn pairs arranged on at least one of the annular inner liner or the annular outer liner, each oxidizer inlet horn pair among the plurality of oxidizer inlet horn pairs including (a) a first oxidizer inlet horn that provides a first lateral flow of an oxidizer gas therethrough into the combustion chamber in a first lateral direction with respect to the axial flow direction, (b) a second oxidizer inlet horn, arranged adjacent to the first oxidizer inlet horn, that provides a second lateral flow of the oxidizer gas therethrough into the combustion chamber in a second lateral direction with respect to the axial flow direction opposite the first lateral direction, the first lateral flow of the oxidizer and the second lateral flow of the oxidizer diverging from one another, and (c) a third oxidizer inlet horn arranged between the first oxidizer inlet horn and the second oxidizer inlet horn, and the first oxidizer inlet horn, the second oxidizer inlet horn, and the third oxidizer inlet horn share a common inlet, wherein (i) the first oxidizer inlet horn has a horn body having a distal end extending from the inner liner cold surface side into the inner flow passage or extending from the outer liner cold surface side into the outer flow passage, and a proximal end being flush with the inner liner hot surface side or flush with the outer liner hot surface side, and (ii) the second oxidizer inlet horn has a horn body having a distal end extending from the inner liner cold surface side into the inner flow passage or extending from the outer liner cold surface side into the outer flow passage, and a proximal end being flush with the inner liner hot surface side or with the outer liner hot surface side.

2. The combustor according to claim 1, wherein (iii) the third oxidizer inlet horn has a horn body having a distal end extending from the inner liner cold surface side into the inner flow passage or extending from the outer liner cold surface side into the outer flow passage and a proximal end being flush with the inner liner hot surface side or with the outer liner hot surface side.

3. The combustor according to claim 1, wherein the third oxidizer inlet horn is arranged to provide a flow of the oxidizer gas therethrough into the combustion chamber perpendicular to the axial flow direction.

4. The combustor according to claim 1, wherein the plurality of oxidizer inlet horn pairs includes (1) a first plurality of oxidizer inlet horn pairs arranged on the outer liner in a first circumferential ring of oxidizer inlet horn pairs at a first plane perpendicular to the axial flow direction, and (2) a second plurality of oxidizer inlet horn pairs arranged on the outer liner in a second circumferential ring of oxidizer inlet horn pairs at a second plane parallel to the first plane and being downstream of the first plane with respect to the axial flow direction.

5. The combustor according to claim 1, wherein the plurality of oxidizer inlet horn pairs includes (1) a first plurality of oxidizer inlet horn pairs arranged on the inner liner in a first circumferential ring of oxidizer inlet horn pairs at a first plane perpendicular to the axial flow direction, and (2) a second plurality of oxidizer inlet horn pairs arranged on the inner liner in a second circumferential ring of oxidizer inlet horn pairs at a second plane parallel to the first plane and being downstream of the first plane with respect to the axial flow direction.

6. The combustor according to claim 1, wherein the plurality of oxidizer inlet horn pairs includes (1) a first plurality of oxidizer inlet horn pairs arranged on the outer liner in a first circumferential ring of oxidizer inlet horn pairs at a first plane perpendicular to the axial flow direction, (2) a second plurality of oxidizer inlet horn pairs arranged on the outer liner in a second circumferential ring of oxidizer inlet horn pairs at a second plane parallel to the first plane and downstream of the first plane with respect to the axial flow direction, (3) a third plurality of oxidizer inlet horn pairs arranged on the inner liner in a third circumferential ring of oxidizer inlet horn pairs at the first plane, and (4) a fourth plurality of oxidizer inlet horn pairs arranged on the inner liner in a fourth circumferential ring of oxidizer inlet horn pairs at the second plane.

7. The combustor according to claim 4, wherein the first plurality of oxidizer inlet horn pairs includes a first oxidizer inlet horn pair and a second oxidizer inlet horn pair, the second plurality of oxidizer inlet horn pairs includes a third oxidizer inlet horn pair and a fourth oxidizer inlet horn pair, the third oxidizer inlet horn pair and the fourth oxidizer inlet horn pair being arranged circumferentially offset from the first oxidizer inlet horn pair and the second oxidizer inlet horn pair, the second lateral flow of the oxidizer gas provided by the second oxidizer inlet horn of the second oxidizer inlet horn pair and the first lateral flow of the oxidizer gas provided by the first oxidizer inlet horn of the third oxidizer inlet horn pair generating a shear component therebetween.

8. A combustor for a gas turbine engine, the combustor comprising:

an annular inner liner having an inner liner cold surface side adjacent to an inner flow passage surrounding the inner liner and an inner liner hot surface side adjacent to a combustion chamber;

an annular outer liner having an outer liner cold surface side adjacent to an outer flow passage surrounding the outer liner and an outer liner hot surface side adjacent to the combustion chamber;

the combustion chamber formed between the inner liner hot surface side and the outer liner hot surface side, the combustion chamber providing for a flow of combustion gases in an axial flow direction from an upstream end of the combustion chamber to a downstream end of the combustion chamber; and a plurality of oxidizer inlet horn pairs arranged on at least one of the annular inner liner or the annular outer liner, each oxidizer inlet horn pair among the plurality of oxidizer inlet horn pairs including (a) a first oxidizer inlet horn having a horn body with a distal end extending from the inner liner cold surface side into the inner flow passage or extending from the outer liner cold surface side into the outer flow passage, and a proximal end being flush with the inner liner hot surface side or with the outer liner hot surface side, and having an axial flow passage with a central axis arranged at a first angle that provides a first lateral flow of an oxidizer gas therethrough into the combustion chamber in a first lateral direction with respect to the axial flow direction, and (b) a second oxidizer inlet horn arranged adjacent to the first oxidizer inlet horn and having a horn body with a distal end extending from the inner liner cold surface side into the inner flow passage or extending from the outer liner cold surface side into the outer flow passage and a proximal end being flush with the inner liner hot surface side or with the outer liner hot surface side, and having an axial flow passage with a central axis arranged at a second angle that provides a second lateral flow of the oxidizer gas therethrough into the combustion chamber in a second lateral direction with respect to the axial flow direction opposite the first lateral direction, the first lateral flow of the oxidizer and the second lateral flow of the oxidizer diverging from one another, wherein, the plurality of oxidizer inlet horn pairs includes a first plurality of oxidizer inlet horn pairs arranged in a first circumferential ring of oxidizer inlet horn pairs at a first plane perpendicular to the axial flow direction, and a second plurality of oxidizer inlet horn pairs arranged in a second circumferential ring of oxidizer inlet horn pairs at a second plane parallel to the first plane and being downstream of the first plane, the first plurality of oxidizer inlet horn pairs including a first oxidizer inlet horn pair and the second plurality of oxidizer inlet horn pairs including a second oxidizer inlet horn pair, the second oxidizer inlet horn pair being arranged circumferentially offset from the first oxidizer inlet horn pair, the second lateral flow of the oxidizer gas provided by the second oxidizer inlet horn of the first oxidizer inlet horn pair and the first lateral flow of the oxidizer gas provided by the first oxidizer inlet horn of the second oxidizer inlet horn pair generating a shear component therebetween, wherein at least one of the first oxidizer inlet horn pair or the second oxidizer inlet horn pair further comprises a third oxidizer inlet horn that provides a flow of the oxidizer gas therethrough into the combustion chamber, the third oxidizer inlet horn having a horn body having a distal end extending from the inner liner cold surface side into the inner flow passage or extending from the outer liner cold surface side into the outer flow passage and a proximal end being flush with the inner liner hot surface side or flush with the outer liner hot surface side, wherein the third oxidizer inlet horn is arranged between the first oxidizer inlet horn and the second oxidizer inlet horn, and the first oxidizer inlet horn, the second oxidizer inlet horn, and the third oxidizer inlet horn share a common inlet.

9. The combustor according to claim 8, wherein the third oxidizer inlet horn is arranged to provide the flow of oxidizer gas into the combustion chamber in a direction perpendicular to the axial flow direction.

10. The combustor according to claim 8, wherein the first plurality of oxidizer inlet horn pairs further includes a third oxidizer inlet horn pair arranged in the first circumferential ring such that the second oxidizer inlet horn pair is arranged circumferentially between the first oxidizer inlet horn pair and the third oxidizer inlet horn pair.

11. The combustor according to claim 10, wherein the second lateral flow of the oxidizer gas from the second oxidizer inlet horn of the second oxidizer inlet horn pair, and the first lateral flow of the oxidizer from the first oxidizer inlet horn of the third oxidizer inlet horn pair generate a shear component therebetween.

12. A gas turbine engine, comprising:
a compressor section; and
a combustor that receives a flow of compressed air from the compressor section, the combustor comprising:
an annular inner liner having an inner liner cold surface side adjacent to an inner flow passage and an inner liner hot surface side adjacent to a combustion chamber;
an annular outer liner having an outer liner cold surface side adjacent to an outer flow passage and an outer liner hot surface side adjacent to the combustion chamber;
the combustion chamber formed between the inner liner hot surface side and the outer liner hot surface side, the combustion chamber providing for a flow of combustion gases in an axial flow direction from an upstream end of the combustion chamber to a downstream end of the combustion chamber;
an inner casing arranged radially inward of the annular inner liner, the inner flow passage being defined between the inner casing and the annular inner liner and a flow of the compressed air being provided therewithin;
an outer casing arranged radially outward of the annular outer liner, the outer flow passage being defined between the outer casing and the annular outer liner and a flow of the compressed air being provided therewithin; and
a plurality of oxidizer inlet horn pairs arranged on at least one of the annular inner liner or the annular outer liner, each oxidizer inlet horn pair among the plurality of oxidizer inlet horn pairs including (a) a first inlet horn that provides a first lateral flow of the compressed air therethrough into the combustion chamber in a first lateral direction with respect to the axial flow direction, and (b) a second inlet horn, arranged adjacent to the first inlet horn, that provides a second lateral flow of the compressed air therethrough into the combustion chamber in a second lateral direction with respect to the axial flow direction opposite the first lateral direction, the first lateral flow of the compressed air and the second lateral flow of the compressed air diverging from one another, and (c) a third inlet horn arranged between the first inlet horn and the second inlet horn, and the first inlet horn, the second inlet horn, and the third inlet horn share a common inlet, wherein (i) the first inlet horn has a horn body having a distal end extending from the inner liner cold surface side into the inner flow passage or extending from the outer liner cold surface side into the outer flow passage, and a proximal end being flush with the inner liner hot surface side or flush with the outer liner hot surface side, and (ii) the second inlet horn has a horn body having a distal end extending from the inner liner cold surface side into the inner flow passage or extending from the outer liner cold surface side into the outer flow passage, and a proximal end being flush with the inner liner hot surface side or with the outer liner hot surface side.

13. The gas turbine engine according to claim 12, wherein (iii) the third inlet horn has a horn body having distal end extending from the inner liner cold surface side into the inner flow passage or extending from the outer liner cold surface side into the outer flow passage and a proximal end being flush with the inner liner hot surface side or with the outer liner hot surface side.

14. The gas turbine engine according to claim 12, wherein the third inlet horn is arranged to provide a flow of the compressed air therethrough into the combustion chamber perpendicular to the axial flow direction.

15. The gas turbine engine according to claim 12, wherein the plurality of oxidizer inlet horn pairs includes (1) a first plurality of oxidizer inlet horn pairs arranged on the outer liner in a first circumferential ring of oxidizer inlet horn pairs at a first plane perpendicular to the axial flow direction, and (2) a second plurality of oxidizer inlet horn pairs arranged on the outer liner in a second circumferential ring of oxidizer inlet horn pairs at a second plane parallel to the first plane and being downstream of the first plane with respect to the axial flow direction.

16. The gas turbine engine according to claim 12, wherein the plurality of oxidizer inlet horn pairs includes (1) a first plurality of oxidizer inlet horn pairs arranged on the inner liner in a first circumferential ring of oxidizer inlet horn pairs at a first plane perpendicular to the axial flow direction, and (2) a second plurality of oxidizer inlet horn pairs arranged on the inner liner in a second circumferential ring of oxidizer inlet horn pairs at a second plane parallel to the first plane and being downstream of the first plane with respect to the axial flow direction.

17. The gas turbine engine according to claim 12, wherein the plurality of oxidizer inlet horn pairs includes (1) a first plurality of oxidizer inlet horn pairs arranged on the outer liner in a first circumferential ring of oxidizer inlet horn pairs at a first plane perpendicular to the axial flow direction, (2) a second plurality of oxidizer inlet horn pairs arranged on the outer liner in a second circumferential ring of oxidizer inlet horn pairs at a second plane parallel to the first plane and downstream of the first plane with respect to the axial flow direction, (3) a third plurality of oxidizer inlet horn pairs arranged on the inner liner in a third circumferential ring of oxidizer inlet horn pairs at the first plane, and (4) a fourth plurality of oxidizer inlet horn pairs arranged on the inner liner in a fourth circumferential ring of oxidizer inlet horn pairs at the second plane.

18. The gas turbine engine according to claim 15, wherein the first plurality of oxidizer inlet horn pairs includes a first oxidizer inlet horn pair and a second oxidizer inlet horn pair, the second plurality of oxidizer inlet horn pairs includes a third oxidizer inlet horn pair and a fourth oxidizer inlet horn pair, the third oxidizer inlet horn pair and the fourth oxidizer inlet horn pair being arranged circumferentially offset from the first oxidizer inlet horn pair and the second oxidizer inlet horn pair, the second lateral flow of the compressed air provided by the second inlet horn of the second oxidizer inlet horn pair and the first lateral flow of the compressed air provided by the first inlet horn of the third oxidizer inlet horn pair generating a shear component therebetween.

* * * * *